(12) United States Patent
Franke et al.

(10) Patent No.: US 11,254,841 B2
(45) Date of Patent: *Feb. 22, 2022

(54) ADDITIVE MANUFACTURING METHODS FOR ADHESIVES AND ADHESIVE ARTICLES

(71) Applicant: 3M INNOVATIVE PROPERTIES COMPANY, St. Paul, MN (US)

(72) Inventors: Carsten Franke, St. Paul, MN (US); Joseph C. Dingeldein, Blaine, MN (US); Jay A. Esch, River Falls, WI (US); Robert L. W. Smithson, Mahtomedi, MN (US); Jayshree Seth, Woodbury, MN (US); Olester Benson, Jr., Woodbury, MN (US); Karen J. Calverley, Stillwater, MN (US); Alexander J. Huffman, St. Paul, MN (US); Serkan Yurt, St. Paul, MN (US); Setareh Niknezhad, Woodbury, MN (US); Michael A. Kropp, Cottage Grove, MN (US); John P. Baetzold, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/538,034

(22) PCT Filed: Dec. 23, 2016

(86) PCT No.: PCT/US2016/068465
§ 371 (c)(1),
(2) Date: Jun. 20, 2017

(87) PCT Pub. No.: WO2017/117035
PCT Pub. Date: Jul. 6, 2017

(65) Prior Publication Data
US 2018/0291239 A1 Oct. 11, 2018

Related U.S. Application Data

(60) Provisional application No. 62/272,479, filed on Dec. 29, 2015.

(51) Int. Cl.
*C09J 4/00* (2006.01)
*B33Y 10/00* (2015.01)
(Continued)

(52) U.S. Cl.
CPC ........ *C09J 4/00* (2013.01); *B05D 3/06* (2013.01); *B05D 5/10* (2013.01); *B29C 35/0805* (2013.01);
(Continued)

(58) Field of Classification Search
CPC .. B05D 5/10; B05D 3/06; B33Y 80/00; B33Y 10/00; B33Y 30/00; B33Y 50/02;
(Continued)

(56) References Cited

U.S. PATENT DOCUMENTS

| 2,797,201 A | 6/1957 | Veatch |
| 3,365,315 A | 1/1968 | Beck |

(Continued)

FOREIGN PATENT DOCUMENTS

| CA | 2098901 | 1/1994 |
| CN | 1303422 | 7/2001 |

(Continued)

OTHER PUBLICATIONS

International Search report for PCT International Application No. PCT/US2016/068465 dated Apr. 5, 2017, 5 pages.

*Primary Examiner* — Jacob T Minskey
*Assistant Examiner* — Caroline Beha
(74) *Attorney, Agent, or Firm* — Adrian L. Pishko

(57) ABSTRACT

A method of making an adhesive is provided, including obtaining an actinic radiation-polymerizable adhesive precursor composition disposed against a surface of an actinic radiation-transparent substrate and irradiating a first portion
(Continued)

of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage. The first portion and the second portion are adjacent to or overlapping with each other and the first irradiation dosage and the second irradiation dosage are not the same. The method forms an integral adhesive having a variable thickness in an axis normal to the surface of the actinic radiation-transparent substrate. Also, an adhesive article is provided, including a substrate having a major surface and an integral adhesive disposed on the major surface of the substrate.

15 Claims, 10 Drawing Sheets

(51) Int. Cl.

| | | |
|---|---|---|
| *B33Y 80/00* | (2015.01) | |
| *B29C 35/08* | (2006.01) | |
| *C09J 5/00* | (2006.01) | |
| *B05D 3/06* | (2006.01) | |
| *B05D 5/10* | (2006.01) | |
| *B29K 105/00* | (2006.01) | |
| *C09J 133/00* | (2006.01) | |
| *C09J 7/20* | (2018.01) | |
| *B29C 64/112* | (2017.01) | |
| *B33Y 30/00* | (2015.01) | |
| *B33Y 50/02* | (2015.01) | |
| *B33Y 70/00* | (2020.01) | |
| *C09J 9/00* | (2006.01) | |
| *C09J 7/38* | (2018.01) | |
| *C09J 11/04* | (2006.01) | |
| *C08F 220/18* | (2006.01) | |
| *B29K 33/04* | (2006.01) | |

(52) U.S. Cl.
CPC ............ *B29C 64/112* (2017.08); *B33Y 10/00* (2014.12); *B33Y 30/00* (2014.12); *B33Y 50/02* (2014.12); *B33Y 70/00* (2014.12); *B33Y 80/00* (2014.12); *C09J 5/00* (2013.01); *C09J 7/20* (2018.01); *C09J 7/385* (2018.01); *C09J 9/00* (2013.01); *C09J 11/04* (2013.01); *C09J 133/00* (2013.01); *B29C 2035/0827* (2013.01); *B29K 2033/04* (2013.01); *B29K 2105/0097* (2013.01); *C08F 220/1811* (2020.02); *C09J 2301/302* (2020.08); *C09J 2301/416* (2020.08); *C09J 2433/00* (2013.01); *C09J 2467/005* (2013.01)

(58) Field of Classification Search
CPC ................ B33Y 70/00; B29C 35/0805; B29C 2035/0827; B29C 64/112; B29C 64/264; C09J 2201/606; C09J 2205/31; C09J 4/00; C09J 5/00; C09J 7/20; C09J 7/385; C09J 9/00; C09J 11/04; C09J 133/00; C09J 2301/302; C09J 2301/416; C09J 2433/00; C09J 2467/005; C09J 2301/304; B29K 2105/0097; B29K 2033/04; C08F 220/1811
See application file for complete search history.

(56) References Cited

U.S. PATENT DOCUMENTS

| | | | |
|---|---|---|---|
| 4,329,384 A | 5/1982 | Vesley | |
| 4,330,590 A | 5/1982 | Vesley | |
| 4,950,696 A | 8/1990 | Palazotto | |
| 5,059,359 A * | 10/1991 | Hull ...................... | B33Y 50/00 264/401 |
| 5,104,592 A | 4/1992 | Hull | |
| 5,198,524 A * | 3/1993 | Bush ................... | C08F 299/026 528/110 |
| 5,264,278 A * | 11/1993 | Mazurek ................... | C09J 4/06 428/317.3 |
| 5,531,855 A | 7/1996 | Heinecke | |
| 5,536,467 A * | 7/1996 | Reichle ................. | G02B 26/10 264/401 |
| 5,658,063 A | 8/1997 | Nasserbakht | |
| 5,856,022 A * | 1/1999 | McCormick .......... | C08F 265/06 428/500 |
| 5,905,545 A | 5/1999 | Poradish | |
| 6,254,954 B1 | 7/2001 | Bennett et al. | |
| 6,448,337 B1 * | 9/2002 | Gaddam ................ | C09J 7/0217 525/193 |
| 6,467,897 B1 * | 10/2002 | Wu ...................... | C09D 11/101 347/102 |
| 6,472,451 B2 * | 10/2002 | Ha .............................. | C09J 4/06 522/97 |
| 6,587,159 B1 | 7/2003 | Dewald | |
| 6,692,611 B2 | 2/2004 | Oxman et al. | |
| 7,164,397 B2 | 1/2007 | Pettitt | |
| 7,195,472 B2 * | 3/2007 | John ..................... | B29C 64/129 425/89 |
| 7,360,905 B2 | 4/2008 | Davis | |
| 8,705,133 B2 | 4/2014 | Lieb | |
| 8,820,944 B2 | 9/2014 | Vasquez | |
| 8,920,592 B2 | 12/2014 | Suwa | |
| 9,375,881 B2 * | 6/2016 | Elsey .................. | B29C 35/0805 |
| 2001/0026907 A1 | 10/2001 | Husemann | |
| 2002/0128340 A1 * | 9/2002 | Young ..................... | B41M 3/006 522/1 |
| 2003/0236362 A1 | 12/2003 | Bluem | |
| 2004/0065552 A1 * | 4/2004 | Cohen .................... | H05K 3/241 205/118 |
| 2004/0192804 A1 * | 9/2004 | Kura ......................... | C08F 2/50 522/65 |
| 2005/0036090 A1 * | 2/2005 | Hayashi .............. | B81C 1/00269 349/122 |
| 2006/0115783 A1 * | 6/2006 | McLaren ............. | A61C 19/004 433/29 |
| 2007/0031791 A1 | 2/2007 | Cinader, Jr. | |
| 2007/0054234 A1 | 3/2007 | Oxman | |
| 2011/0087350 A1 | 4/2011 | Fogel et al. | |
| 2011/0151195 A1 | 6/2011 | Mitsukura | |
| 2012/0181703 A1 | 7/2012 | Park | |
| 2013/0310507 A1 | 11/2013 | Tummala et al. | |
| 2014/0339741 A1 * | 11/2014 | Aghababaie ............ | B29C 64/20 264/401 |
| 2015/0061170 A1 | 3/2015 | Engel | |
| 2015/0137426 A1 * | 5/2015 | Van Esbroeck ....... | B29C 64/129 264/401 |
| 2016/0046075 A1 | 2/2016 | DeSimone | |
| 2016/0200051 A1 | 7/2016 | Urbanic | |
| 2016/0218287 A1 | 7/2016 | McAlpine et al. | |
| 2017/0057174 A1 * | 3/2017 | Megretski ................ | B29C 64/20 |
| 2017/0057177 A1 * | 3/2017 | Ferguson ................ | B29C 64/35 |
| 2018/0015662 A1 * | 1/2018 | Ermoshkin ............ | B33Y 10/00 |
| 2018/0237325 A1 | 8/2018 | Li | |

FOREIGN PATENT DOCUMENTS

| | | |
|---|---|---|
| CN | 103561927 | 2/2012 |
| CN | 102792218 | 11/2012 |
| CN | 102874003 | 1/2013 |
| EP | 1473594 | 11/2004 |
| EP | 1886800 | 2/2008 |
| EP | 2343730 | 7/2011 |

(56) References Cited

FOREIGN PATENT DOCUMENTS

| | | |
|---|---|---|
| EP | 2366751 | 9/2011 |
| EP | 2568025 | 3/2013 |
| JP | S 60-072927 | 4/1985 |
| JP | 2004-300333 | 10/2004 |
| JP | 2008-032940 | 2/2008 |
| JP | 2010-077389 | 4/2010 |
| JP | 2013-186140 | 9/2013 |
| KR | 101190855 | 10/2012 |
| TW | 201714844 | 5/2017 |
| WO | WO 1996-14215 | 5/1996 |
| WO | WO 1998-12021 | 3/1998 |
| WO | WO 99/50368 | 10/1999 |
| WO | WO 2012-166460 | 12/2012 |
| WO | WO 2012/166462 | 12/2012 |
| WO | WO 2014-165265 | 10/2014 |
| WO | WO 2014-186265 | 11/2014 |
| WO | WO 2015/149054 | 10/2015 |
| WO | WO 2015/152359 | 10/2015 |
| WO | WO 2017-116678 | 6/2017 |
| WO | WO 2017-116679 | 6/2017 |

\* cited by examiner

US 11,254,841 B2

ADDITIVE MANUFACTURING METHODS FOR ADHESIVES AND ADHESIVE ARTICLES

CROSS REFERENCE TO RELATED APPLICATIONS

This application is a national stage filing under 35 U.S.C. 371 of PCT/US2016/068465, filed Dec. 23, 2016, which claims the benefit of U.S. Application No. 62/272,479, filed Dec. 29, 2015, the disclosure of which is incorporated by reference in its/their entirety herein.

TECHNICAL FIELD

The present disclosure relates to additive manufacturing of adhesives.

BACKGROUND

In various industries, components of devices are joined together using an adhesive, such as a pressure sensitive adhesive, a hot melt adhesive, or a structural adhesive. The smaller the devices, the greater the precision of the adhesives. Typically, such adhesives are prepared by die-cutting of a layer of adhesive to a desired shape or by dispensing an adhesive composition from a syringe.

SUMMARY

The present disclosure relates to additive manufacturing of adhesives.

As devices are miniaturized, the need for higher precision delivery of adhesives increases. Moreover, there are certain shapes of adhesives that cannot be prepared by die-cutting of an adhesive, for instance a wedge shape or any shape that has a variation in thickness. It has been discovered that there exists a need for additional methods for manufacturing adhesives.

In a first aspect, a method of making an adhesive is provided. The method includes obtaining an actinic radiation-polymerizable adhesive precursor composition disposed against a surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage. The first portion and the second portion are adjacent to or overlapping with each other and the first irradiation dosage and the second irradiation dosage are not the same. The method forms an integral adhesive having a variable thickness in an axis normal to the surface of the actinic radiation-transparent substrate.

In a second aspect, an adhesive article is provided. The adhesive article includes a substrate having a major surface and an integral adhesive disposed on the major surface of the substrate. The adhesive has a variable thickness in an axis normal to the major surface of the substrate.

The above summary of the present disclosure is not intended to describe each disclosed aspect or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
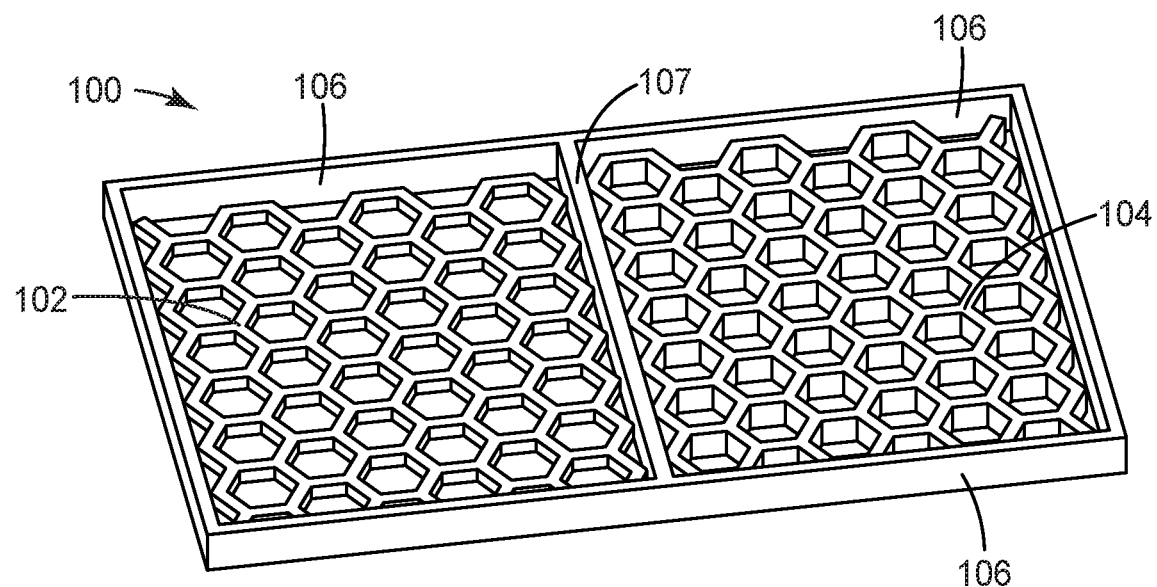
FIG. 1 is a schematic perspective view of an exemplary adhesive according to the present disclosure.

The present disclosure provides methods for the additive manufacturing of adhesives, such as integral adhesives. The integral adhesives have variations in shape or thickness. The present disclosure further provides integral adhesives comprising variations in refractive index.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "actinic radiation" refers to electromagnetic radiation that can produce photochemical reactions.

The term "dosage" means a level of exposure to actinic radiation derived from the intensity and time of the actinic radiation. For instance, at the same wavelength, the dosage is the time multiplied by the intensity of the actinic radiation.

The term "integral" means composed of parts that together constitute a whole.

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate). Acrylate and methacrylate monomers, oligomers, or polymers are referred to collectively herein as "acrylates".

The term "aliphatic group" means a saturated or unsaturated linear or branched hydrocarbon group. This term is used to encompass alkyl, alkenyl, and alkynyl groups, for example.

The term "alkyl group" means a saturated hydrocarbon group that is linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl group include without limitation, methyl, ethyl, isopropyl, t-butyl, heptyl, dodecyl, octadecyl, amyl, 2-ethylhexyl, and the like. The term "alkylene group" refers to a divalent alkyl group.

The term "alicyclic group" means a cyclic hydrocarbon group having properties resembling those of aliphatic groups. The term "aromatic group" or "aryl group" means a mono- or polynuclear aromatic hydrocarbon group.

The term "pattern" with respect to an adhesive refers to a design of an adhesive that defines at least one aperture in the adhesive.

The term "solvent" refers to a substance that dissolves another substance to form a solution.

The term "total monomer" refers to the combination of all monomers in an adhesive composition, including both in a polymerized reaction product and in optional additional materials.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In a first aspect, a method is provided. The method includes obtaining an actinic radiation-polymerizable adhesive precursor composition disposed against a surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage. The first portion and the second portion are adjacent to or overlapping with each other and the first irradiation dosage and the second irradiation dosage are not the same. The method forms an integral adhesive having a variable thickness in an axis normal to the surface of the actinic radiation-transparent substrate.

Referring to FIG. 1, an integral adhesive made by a method according to the first aspect is illustrated. The integral adhesive 100 includes a first array of interconnected hexagons 102, an adjacent second array of interconnected hexagons 104, and a frame 106 that has a plurality of walls surrounding each of the first array of interconnected hexagons 102 and the second array of interconnected hexagons 104. For instance, the frame 106 includes a frame wall 107 that separates the first array of interconnected hexagons 102 from the second array of interconnected hexagons 104. The integral adhesive 100 may be composed of any adhesive disclosed herein.

An exemplary method of forming the integral adhesive 100 includes placing an actinic radiation-polymerizable adhesive precursor composition against a surface of an actinic radiation-transparent substrate and irradiating a first portion of the actinic radiation-polymerizable adhesive precursor composition through the actinic radiation-transparent substrate for a first irradiation dosage. The first portion may be defined by positioning an exposure image adjacent to the actinic radiation-transparent substrate, wherein the image includes a pattern provided by, for instance and without limitation, a computer controlled digital light projector (DLP), liquid crystal display (LCD), or laser scanning system; or a photomask; or the like. The pattern either blocks actinic irradiation from passing through all of the regions of the exposure image except for the pattern (e.g., as with a combination of light source and photomask), or provides actinic irradiation in the shape of the pattern (e.g., as with a laser or an array of pixels). When the exposure image includes a photomask, the positioning of the exposure image is typically a physical positioning of the photomask adjacent to the actinic radiation-transparent substrate. In contrast, when the exposure image includes actinic irradiation in the shape of the pattern (e.g., via digital projection or laser scanning), the positioning of the exposure image is typically a positioning of the irradiation source, and the irradiation source is directed towards the actinic radiation-transparent substrate. When the first portion of the actinic radiation-polymerizable adhesive precursor composition is irradiated through the actinic radiation-transparent substrate for the first irradiation dosage, an adhesive is at least partially polymerized from the actinic radiation-polymerizable adhesive precursor composition in the shape of the first portion. As the actinic irradiation first reaches the adhesive precursor composition that is in contact with the substrate, the adhesive polymerizes on the surface of the substrate and continues to polymerize in a direction normal to the substrate surface. Generally, the greater the irradiation dosage, the further into the actinic radiation-polymerizable adhesive precursor composition (normal to the substrate surface) the actinic irradiation travels, and the thicker the resulting adhesive.

Figure 2A:
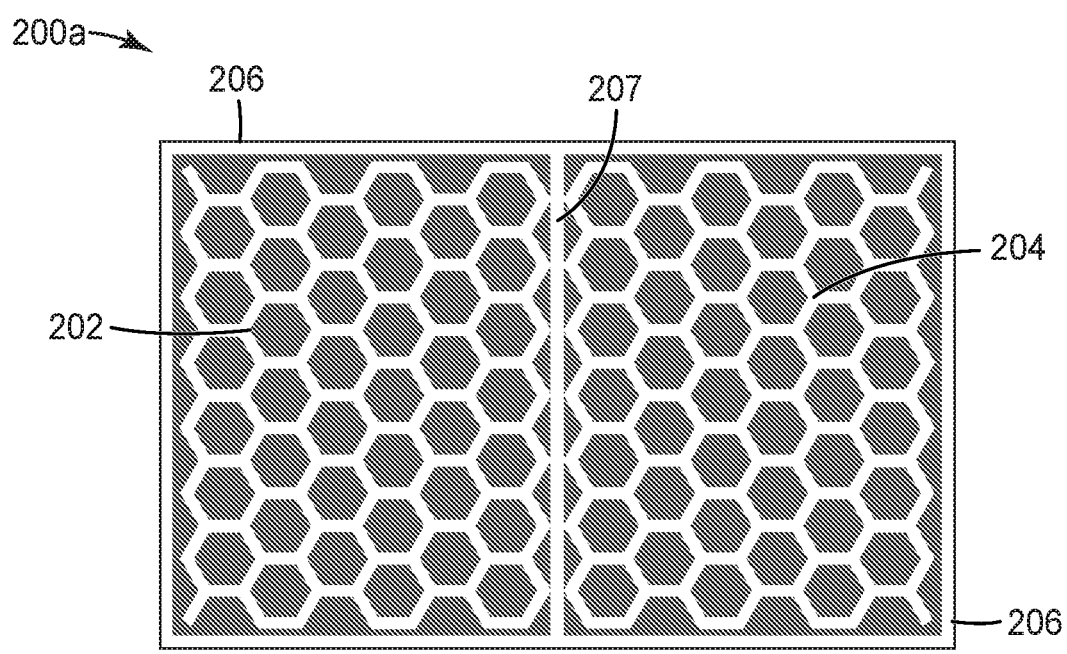
FIG. 2A is a schematic top view of a first exposure image for the formation of the adhesive of FIG. 1.
Figure 2B:
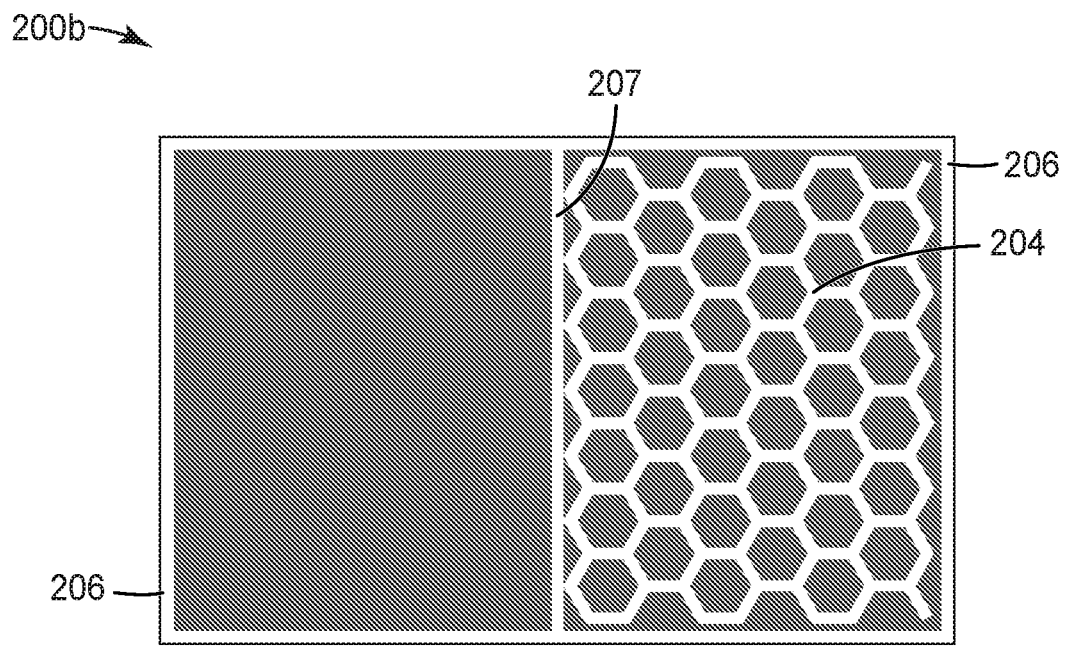
FIG. 2B is a schematic top view of a second exposure image for the formation of the adhesive of FIG. 1.
Figure 2C:
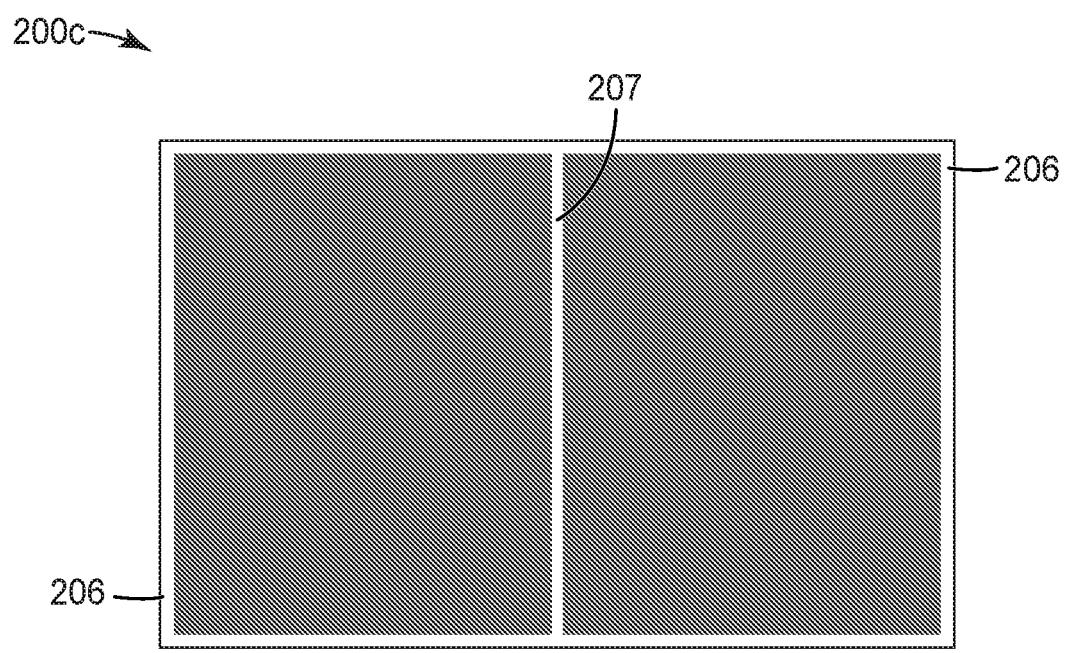
FIG. 2C is a schematic top view of a third exposure image for the formation of the adhesive of FIG. 1.

Turning now to FIGS. 2A-2C, three exposure images are illustrated. FIG. 2A provides a top view of an exemplary first exposure image 200a employed to allow irradiation of the first portion of the actinic radiation-polymerizable adhesive precursor composition. The exposure image 200a includes each of the features described above with respect to the integral adhesive illustrated in FIG. 1; namely, a first array of interconnected hexagons 202, an adjacent second array of interconnected hexagons 204, and a frame 206 that has a plurality of walls surrounding each of the first array of interconnected hexagons 202 and the second array of interconnected hexagons 204. The frame 206 further includes a frame wall 207 that separates the first array of interconnected hexagons 202 from the second array of interconnected hexagons 204.

The method further includes irradiating a second portion of the actinic radiation-polymerizable adhesive precursor composition through the actinic radiation-transparent substrate for a second irradiation dosage. To irradiate the second portion of the actinic radiation-polymerizable adhesive precursor composition, a second exposure image is positioned adjacent to the actinic radiation-transparent substrate (e.g., as discussed above with respect to the first exposure image). FIG. 2B provides a top view of an exemplary second exposure image 200b employed to allow irradiation of the second portion of the actinic radiation-polymerizable adhesive precursor composition. The exposure image 200b includes a select portion of the features included in the first exposure image 200a; namely, the second array of interconnected hexagons 204, the frame 206 having a plurality of walls surrounding the second array of interconnected hexagons 204, and the frame wall 207. Accordingly, when the second portion of the actinic radiation-polymerizable adhesive precursor composition is irradiated through the actinic radiation-transparent substrate for a second irradiation dosage, an adhesive is at least partially polymerized from the actinic radiation-polymerizable adhesive precursor composition in the shape of the second portion. In this case, irradiating the second portion will result in an increase in the thickness of all of the areas of the adhesive except for the first array of hexagons 202, due to the second exposure image 200b overlapping all of the pattern of the first exposure image 200a aside from the first array of hexagons 202. This is because, following the first irradiation and the second irradiation, the first array of hexagons 202 will have been exposed to an irradiation dosage that is less than the total irradiation dosage to which the remainder of the adhesive was exposed.

In certain embodiments, the method further includes irradiating a third portion of the actinic radiation-polymerizable adhesive precursor composition through the actinic radiation-transparent substrate for a third irradiation dosage. To irradiate the third portion of the actinic radiation-polymerizable adhesive precursor composition, a third exposure image is positioned adjacent to the actinic radiation-transparent substrate (e.g., as discussed above with respect to the first exposure image). FIG. 2C provides a top view of an exemplary third exposure image 200c employed to allow irradiation of the third portion of the actinic radiation-polymerizable adhesive precursor composition. The exposure image 200c includes a select portion of the features included in the first exposure image 200a; namely, the frame 206 having a plurality of walls, and the frame wall 207. Accordingly, when the third portion of the actinic radiation-polymerizable adhesive precursor composition is irradiated through the actinic radiation-transparent substrate for a third irradiation dosage, an adhesive is at least partially polymerized from the actinic radiation-polymerizable adhesive precursor composition in the shape of the third portion. In this case, irradiating the third portion will result in an increase in the thickness of the frame 206 and frame wall 207, due to the third exposure image 200c overlapping the frame areas of the pattern of the first exposure image 200a and of the second exposure image 200b. This is because, following the first irradiation, the second irradiation, and the third irradiation, the first frame 206 and the frame wall 207 will have been exposed to an irradiation dosage that is greater than the total irradiation dosage to which the remainder of the adhesive was exposed.

Figure 3:
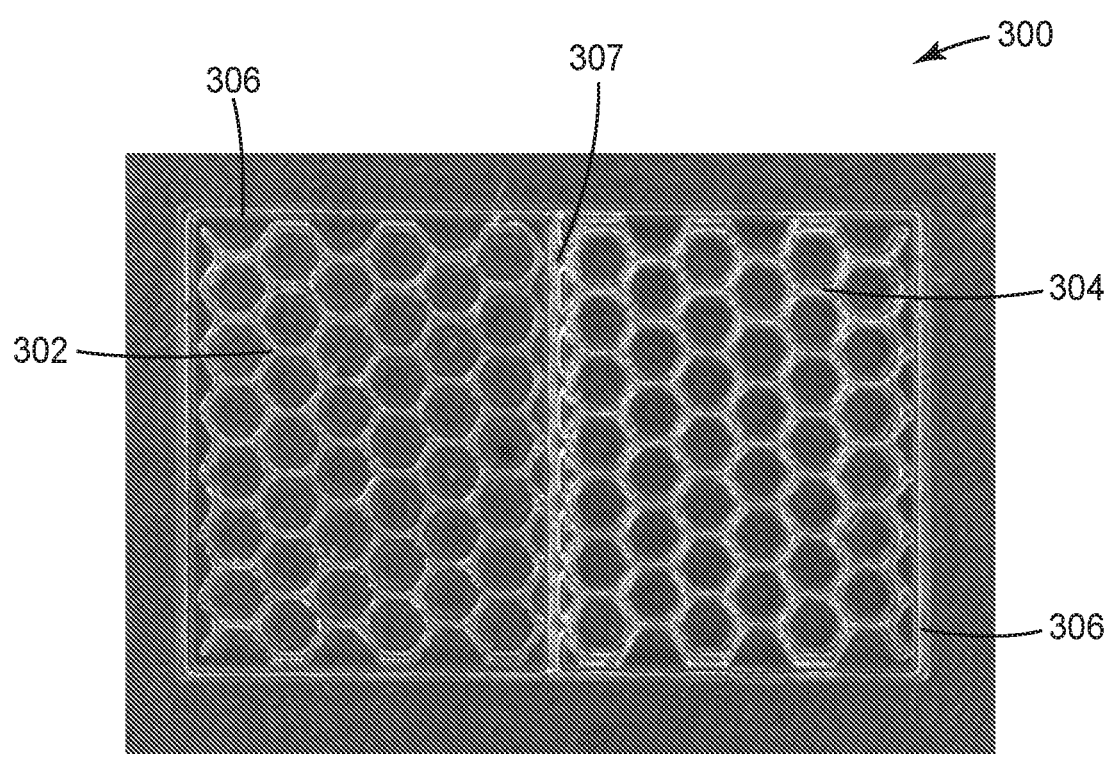
FIG. 3 is a photograph of the adhesive of FIG. 1.

A photograph of an integral adhesive having the same pattern as illustrated in FIG. 1 is provided in FIG. 3. The integral adhesive 300 is formed of the polymerized reaction product of a mixture of acrylic acid, isooctyl acrylate, 2-ethylhexyl acrylate, and IRGACURE TPO photoinitiator and 2,6 Di-tert-butyl-4-methyl-phenol, and TINOPAL OB CO, and includes a first array of interconnected hexagons 302, an adjacent second array of interconnected hexagons 304, and a frame 306 that has a plurality of walls surrounding each of the first array of interconnected hexagons 302 and the second array of interconnected hexagons 304. For instance, the frame 306 includes a frame wall 307 that separates the first array of interconnected hexagons 302 from the second array of interconnected hexagons 304. In this photographed embodiment, the first array of interconnected hexagons 302 have a height of 0.05 millimeters (mm); the second array of interconnected hexagons 304 have a height of 0.10 mm; and the frame 306 (including the frame wall 307) has a height of 0.15 mm. The differences in height of the various portions of the integral adhesive 300 is accomplished using the three irradiation dosages irradiating adjacent or overlapping areas.

Figure 4:
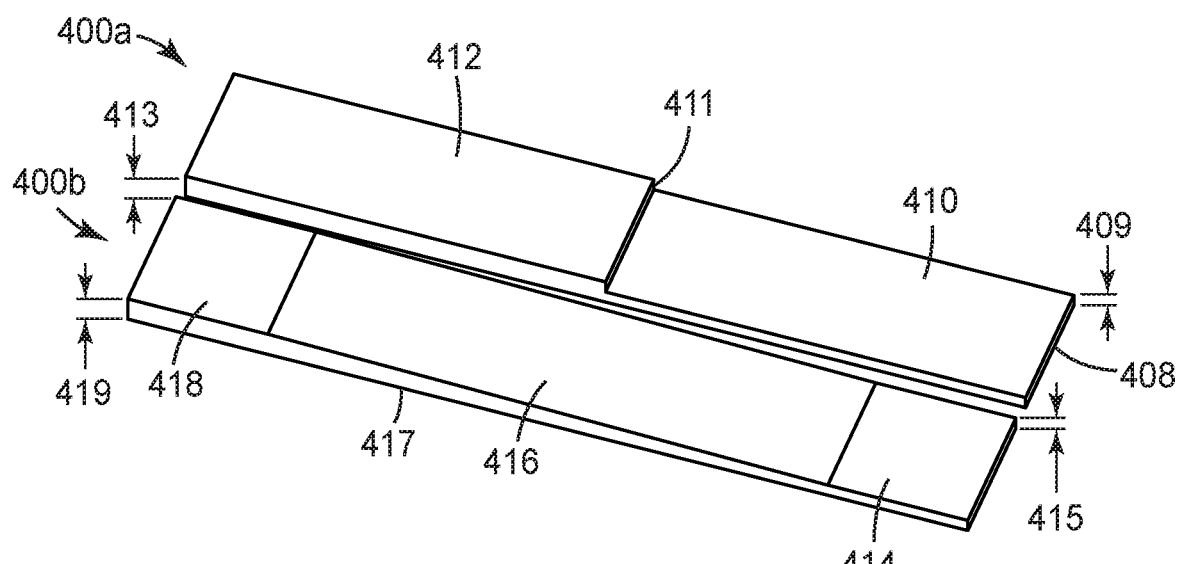
FIG. 4 is a schematic perspective view of two additional exemplary adhesives according to the present disclosure.

Referring now to FIG. 4, two exemplary integral adhesives (400a and 400b) are shown. The first integral adhesive 400a illustrates a height step change from a first portion 410 with a first thickness 409 to a second portion 412 with a second thickness 413. The step change occurs at an interface 411. For instance, the first portion 410 may have a thickness of 0.5 mm and the second portion 412 may have a thickness of 1.0 mm. In certain embodiments, the first integral adhesive 400a may be formed from an actinic radiation-polymerizable adhesive precursor composition using two different irradiation dosages, one each in the shape of the first portion 410 and of the second portion 412. The first integral adhesive 400a includes a major surface 408 that is integral to both the first portion 410 and the second portion 412, formed from actinic radiation-polymerizable adhesive precursor composition disposed against a surface of an actinic radiation-transparent substrate. The thicknesses (411 and 413) of the first portion 410 and the second portion 412 represent the distance normal to the surface of the actinic radiation-transparent substrate that the actinic radiation-polymerizable adhesive precursor composition was polymerized.

In contrast to the large height step change in the first integral adhesive 400a, the second integral adhesive 400b has a more subtle height change that appears to be a gradual slope, although it is made up a plurality of small step changes. More particularly, the second integral adhesive 400b includes a first portion 414 with a first thickness 415, a second portion 418 with a second thickness 419, and a third portion 416 comprising at least ten discrete portions, which in combination have a gradually increasing thickness from the end adjacent to the first portion 414 to the end adjacent to the second portion 418. In certain embodiments, the second integral adhesive 400b may be formed from an actinic radiation-polymerizable adhesive precursor composition using at least twelve different irradiation dosages. The second integral adhesive 400b includes a major surface 417 that is integral to all of the first portion 414, the second portion 418, and the third portion 416 formed from actinic radiation-polymerizable adhesive precursor composition disposed against a surface of an actinic radiation-transparent substrate. The thicknesses of the various portions of the second integral adhesive 400b represent the distance normal to the surface of the actinic radiation-transparent substrate that the actinic radiation-polymerizable adhesive precursor composition was polymerized.

Figure 5:
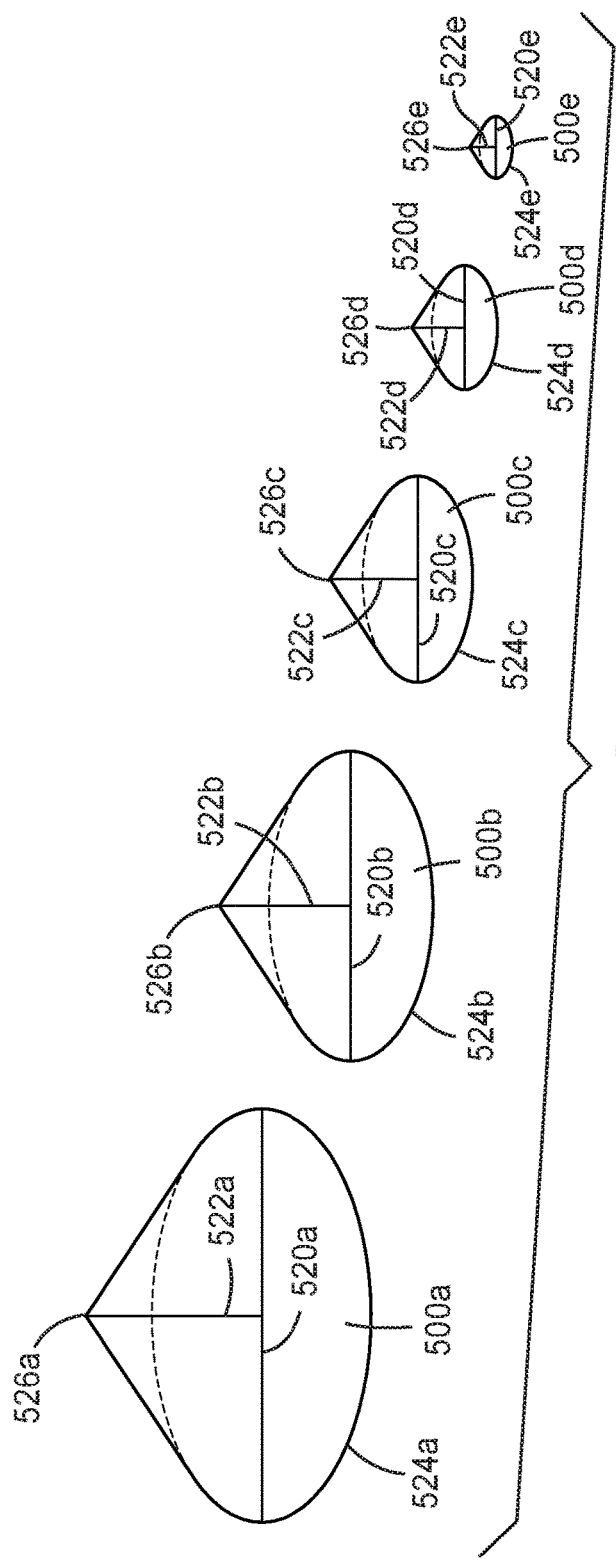
FIG. 5 is a schematic perspective view of an array of exemplary adhesives having different heights according to the present disclosure.

Referring to FIG. 5, an array of integral adhesives each having a cone shape is shown. The first integral adhesive 500a has the largest diameter 520a and peak cone height 522a, the second integral adhesive 500b has the second largest diameter 520b and peak cone height 522b, the third integral adhesive 500c has the third largest diameter 520c and peak cone height 522c, the fourth integral adhesive 500d has the fourth largest diameter 520d and peak cone height 522d, and the fifth integral adhesive 500e has the fifth largest diameter 520e and peak cone height 522e. Each of the cone shaped integral adhesives may be formed from an actinic radiation-polymerizable adhesive precursor composition by the same method. For instance, similar to the second integral adhesive 400b discussed above, each cone has a subtle height change from a base of the cone (524a-524e) that appears to be a gradual slope up to the point of the cone (526a-526e), although it is made up a plurality of small step changes. In practice, a plurality of circles (each having a center located in the same position) is each irradiated, in which each subsequent circle has a smaller diameter than the prior circle, resulting in the polymerization of the actinic radiation-polymerizable adhesive precursor composition in the shape of a cone. The thicknesses of the various portions of the cones 500a-500e represent the distance normal to the surface of the actinic radiation-transparent substrate that the actinic radiation-polymerizable adhesive precursor composition was polymerized, with the points of the cones (526a-526e) being disposed distal to the surface of the substrate.

Figure 6:
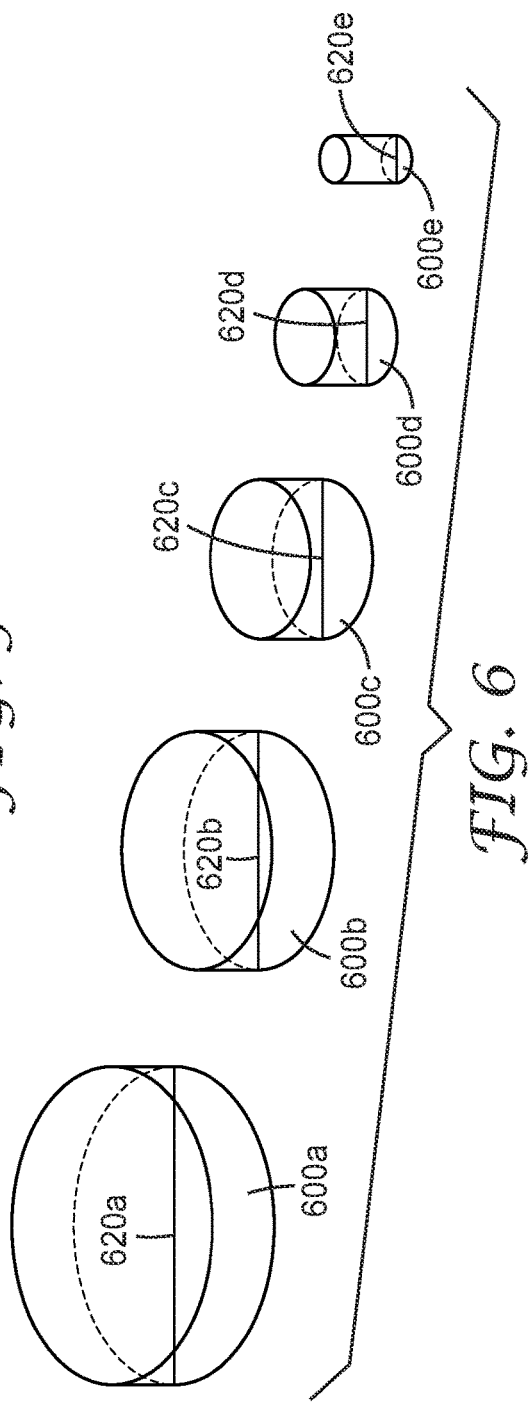
FIG. 6 is a schematic perspective view of an array of exemplary adhesives having different diameters according to the present disclosure.

Referring to FIG. 6, an array of adhesives each having a cylinder shape is shown. The first adhesive 600a has the largest diameter 620a, the second adhesive 600b has the second largest diameter 620b, the third adhesive 600c has the third largest diameter 620c, the fourth adhesive 600d has the fourth largest diameter 620d, and the fifth adhesive 600e has the fifth largest diameter 620e. Each of the cylindrical shaped adhesives may be formed from an actinic radiation-polymerizable adhesive precursor composition by the same method. For instance, the plurality of cylinders having different diameters can be formed during a single irradiation of an actinic radiation-polymerizable adhesive precursor composition disposed against a surface of an actinic radiation-transparent substrate, in which a plurality of discrete circular patterns are irradiated simultaneously.

Figure 7:
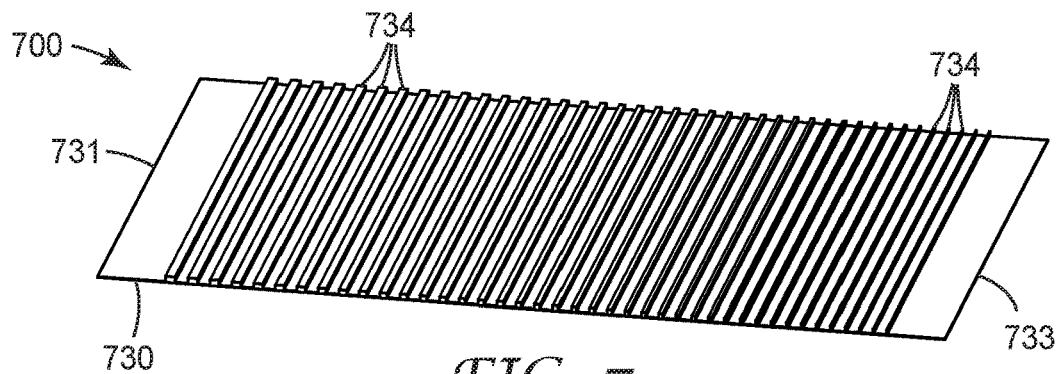
FIG. 7 is a schematic perspective view of an exemplary adhesive having an array of ridges according to the present disclosure.

Referring to FIG. 7, an exemplary integral adhesive is shown. The integral adhesive 700 includes a base layer 730 and a plurality of spaced apart ridges 734, wherein the width of the spaced apart ridges 734 decreases from one end 731 of the base layer 730 to the other end 733 of the base layer 730. For instance, the widths of the spaced apart ridges 734 may vary from about 550 micrometers down to about 40 micrometers. The integral adhesive 700 may be formed from an actinic radiation-polymerizable adhesive precursor composition using two different irradiation dosages. The base layer 730 of the integral adhesive 700 is integral to all of the plurality of ridges 734, and is formed from actinic radiation-polymerizable adhesive precursor composition disposed against a surface of an actinic radiation-transparent substrate during the first irradiation dosage. The thickness of the plurality of spaced apart ridges 734 represents the distance normal to the surface of the actinic radiation-transparent substrate that the actinic radiation-polymerizable adhesive precursor composition was polymerized in the second irradiation dosage. The widths of the plurality of ridges 734 is achieved based on the pattern that is irradiated during the second irradiation dosage.

Figure 8:
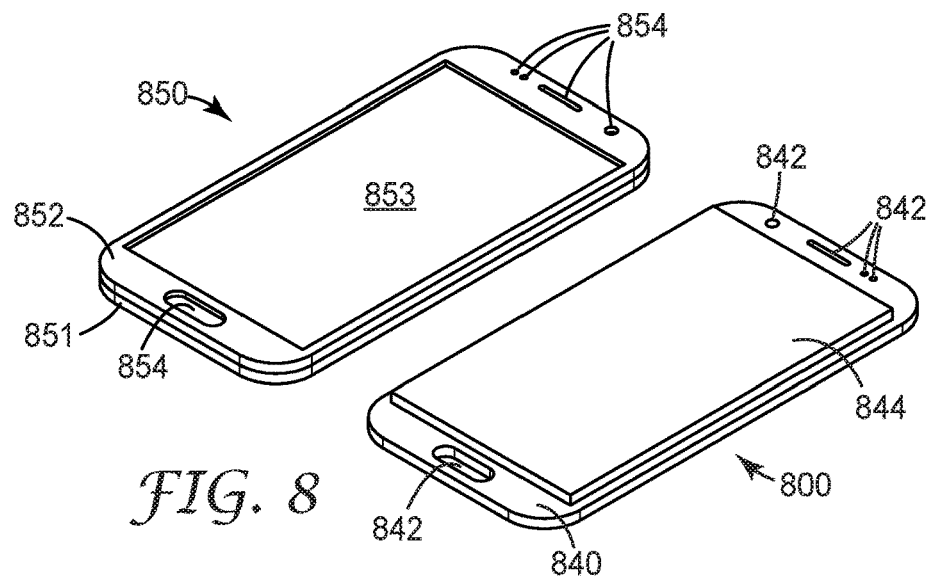
FIG. 8 is a schematic perspective view of an exemplary adhesive for a digital device screen according to the present disclosure.

Turning now to FIG. 8, an exemplary integral adhesive 800 is shown. A cover glass 850 for a digital device screen is also illustrated. The cover glass 850 includes an optically clear glass screen 851 and a black ink bezel 852 screen printed on the glass screen 851 around the perimeter of a major surface 853 of the glass screen 851. The bezel 852 defines a plurality of apertures 854 configured to accommodate one or more of sensors, cameras, speakers, microphones, etc. The integral adhesive 800 comprises an optically clear adhesive for a digital device screen. The integral adhesive 800 includes a base layer 840 and a spacer portion 844. The base layer 840 defines a plurality of apertures 842 configured to accommodate one or more of sensors, cameras, speakers, microphones, etc. The spacer portion 844 is configured to fill the open volume between the bezel 852 of the cover glass 850 and the major surface 853 of the glass screen 851 of the cover glass 850. The integral adhesive 800 may be formed from an actinic radiation-polymerizable adhesive precursor composition using two different irradiation dosages. The base layer 840 of the integral adhesive 800 is integral to the spacer portion 844, and is formed from actinic radiation-polymerizable adhesive precursor composition disposed against a surface of an actinic radiation-transparent substrate during the first irradiation dosage. The apertures 842 are achieved based on the pattern that is irradiated during the first irradiation dosage. The thickness of the spacer portion 844 represents the distance normal to the surface of the actinic radiation-transparent substrate that the actinic radiation-polymerizable adhesive precursor composition was polymerized in the second irradiation dosage. In use, the integral adhesive 800 is fit to the cover glass 850 to assist in adhering the cover glass to a digital device.

Figure 9:
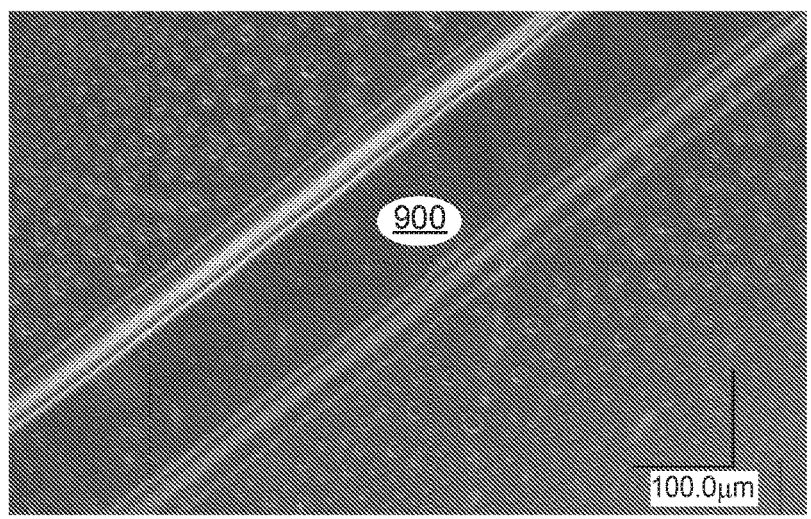
FIG. 9 is a microscopy image view of a line of exemplary adhesive having a width of 216 micrometers according to the present disclosure.

Referring to FIG. 9, a microscopy image view of a line of exemplary adhesive is shown. The microscopy image demonstrates a level of precision achievable by methods of forming adhesives disclosed herein. More particularly, an adhesive line designed to have a width of 200 micrometers in practice had a measured width of 216 micrometers. The bubbles are drops of unpolymerized precursor composition that remained after blowing off the composition.

Figure 10:
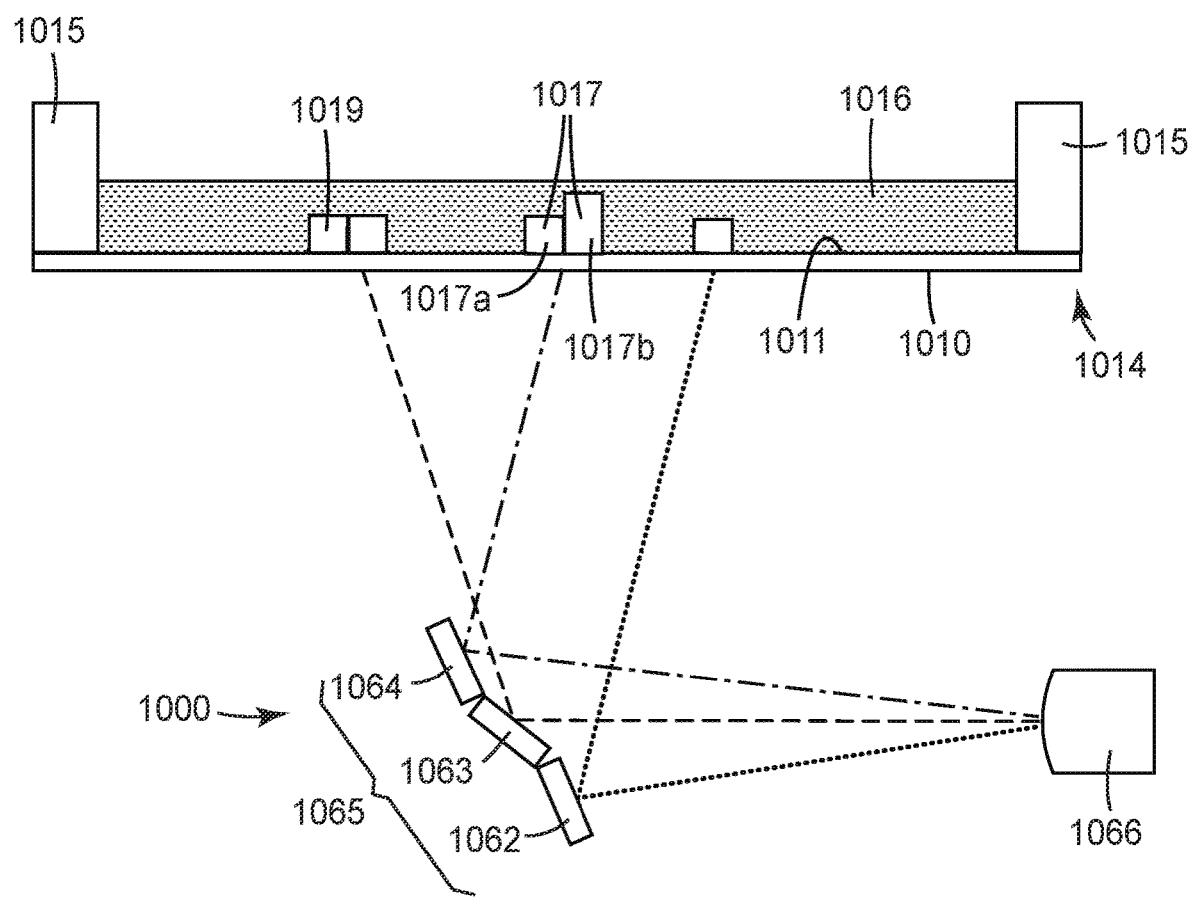
FIG. 10 is a schematic cross-sectional view of an exemplary irradiation source for use according to the present disclosure.

Referring to FIG. 10, a method according to the present disclosure includes obtaining an actinic radiation-polymerizable adhesive precursor composition 1016 disposed against a surface 1011 of an actinic radiation-transparent substrate 1010 and irradiating a first portion of the actinic radiation-polymerizable adhesive precursor composition through the actinic radiation-transparent substrate 1010 for a first irradiation dosage (e.g., using irradiation source 1000 comprising an LED or lamp 1066 and a digital light projector (DLP) 1065 comprising a plurality of reflectors 1062, 1063, and 1064). The method further includes irradiating a second portion of the actinic radiation-polymerizable adhesive precursor composition 1016 through the actinic radiation-transparent substrate 1010 for a second irradiation dosage. The first portion and the second portion are adjacent to or overlapping with each other and the first irradiation dosage and the second irradiation dosage are not the same. The method forms an integral adhesive 1017 having a variable thickness (e.g., 1017a as compared to 1017b) in an axis normal to the surface 1011 of the actinic radiation-transparent substrate 1010.

Unlike photolithography and other additive manufacturing methods in which individual layers of precursor compositions are each cured throughout the thickness (i.e., z-direction), in methods according to the present disclosure the thickness of the integral adhesive is a fraction of the thickness of the precursor composition disposed against the surface of the substrate. In certain embodiments, the ratio of the thickness of the integral adhesive to the thickness of the precursor composition disposed against the surface of the substrate is 10:90, or 15:85, or 20:80, or 25:75, or 30:70, or 40:60, or 50:50, or 60:40, or 70:30, or 80:20, or 90:10.

Advantageously, the methods of the present disclosure provide the capability to easily manufacture individual adhesives having a number of unique shapes due to employing adaptable actinic radiation sources, from which the bounds and dosage of the actinic radiation determine the specific shape of an individual adhesive. For instance, digital light projectors, laser scanning devices, and liquid crystal displays can all be controlled to change the area and intensity of the actinic radiation that causes curing of the actinic radiation-polymerizable adhesive precursor composition.

If an identical shape needs to be produced repeatedly, a photomask or series of photomasks could be utilized to be more cost efficient than other irradiation sources.

As noted above, die-cutting of an adhesive is not readily capable of forming adhesives having a wedge shape or other shapes having thickness variations. Similarly, die-cutting is not amenable to forming an adhesive that has a height gradient or other unique shapes. The present disclosure not only provides adhesives having a wide variety of shapes and gradients, but also multiple different shapes and heights of adhesives on the same substrate.

When the actinic radiation-transparent substrate comprises a polymeric material, the actinic radiation-transparent substrate may comprise for instance and without limitation a polymeric material selected from polyethylene terephthalate, polyethylene naphthalate, polycarbonate, polyimide, cycloolefin films, poly(methyl methacrylate), or combinations thereof. In certain embodiments, the substrate comprises a release liner, a fluoropolymer film, or a glass comprising a release coating. The release liner comprises polyethylene terephthalate and silicone, or polypropylene and silicone. When the actinic radiation-transparent substrate comprises glass, the substrate usually comprises a glass selected from sodium borosilicate glass, soda-lime glass, and quartz glass.

In some embodiments, the substrate comprises a multilayer construction, for example and without limitation, a multilayer construction comprising a polymeric sheet, an adhesive layer, and a liner. Optionally, the multilayer construction comprises a coating upon which the integral adhesive is disposed. In certain embodiments, the substrate is a device. Exemplary devices include an organic light-emitting diode, a sensor, or a solar device.

In certain embodiments, the time of irradiation of the first dosage is different than the time of irradiation of the second dosage, while in other embodiments the actinic radiation intensity of the first dosage is lower than the actinic radiation intensity of the second dosage. Similarly, in certain embodiments the actinic radiation intensity of the first dosage is greater than the actinic radiation intensity of the second dosage, while in other embodiments the actinic radiation intensity of the first dosage is lower than the actinic radiation intensity of the second dosage.

When the first irradiation dosage and the second irradiation dosage are not the same, an integral adhesive is formed comprising a variable thickness in an axis normal to the actinic radiation-transparent substrate. In certain embodiments, the time of irradiation of the first dosage is shorter or longer than the time of irradiation of the second dosage. In certain embodiments, the actinic radiation intensity of the first dosage is lower or higher than the actinic radiation intensity of the second dosage. In certain embodiments, irradiating the first portion occurs before irradiating the second portion, at the same time as irradiating the second portion, or a combination thereof.

In certain embodiments, the actinic radiation-transparent substrate is a floor of a container and the irradiation is directed through the floor from below the floor. For instance, referring again to FIG. 10, a container 1014 is provided comprising side walls 1015 and floor (i.e., actinic radiation-transparent substrate) 1010. The actinic radiation-polymerizable adhesive precursor composition 1016 is disposed on a major surface 1011 of the floor 1010 of the container 1014, and the irradiation is directed through the floor 1010 from the irradiation source 1000 located below the floor 1010. Similarly, referring to FIGS. 11A and 11B, a container 1114 is provided comprising side walls 1115 and floor (i.e., actinic radiation-transparent substrate) 1110; referring to FIG. 12, a container 1214 is provided comprising side walls 1215 and floor (i.e., actinic radiation-transparent substrate) 1210; and referring to FIG. 13, a container 1314 is provided comprising side walls 1315 and floor (i.e., actinic radiation-transparent substrate) 1310.

In certain embodiments, the method further comprises removing actinic radiation-polymerizable adhesive precursor composition remaining in contact with the adhesives (e.g., the first adhesive, the second adhesive, and/or the integral adhesive, etc.). Removing precursor composition that has not been polymerized after the irradiating may involve the use of gravity, a gas, a vacuum, a fluid, or any combination thereof, such as pouring off at least a portion of the adhesive precursor composition remaining in contact with the adhesive after the irradiating, or blowing off at least a portion of the adhesive precursor composition using an air knife or nozzle. Optionally, a suitable fluid for removing excess adhesive precursor composition includes a solvent. When the adhesive will be post-cured, it may be particularly desirable to remove residual precursor composition from being in contact with the adhesive, to minimize or prevent the addition of adhesive material to the desired shape and size of the adhesive upon post-curing.

The type of adhesive that may be manufactured by the methods according to the disclosure is not particularly limited. For example and without limitation, the adhesive may be a pressure sensitive adhesive (PSA), a structural adhesive, a structural hybrid adhesive, a hot melt adhesive, or a combination thereof. For example, the adhesive is often prepared from an actinic radiation-polymerizable adhesive precursor composition comprising an acrylate, a two-part acrylate and epoxy system, a two-part acrylate and urethane system, or a combination thereof. In certain embodiments, the actinic radiation-polymerizable adhesive precursor composition is a 100% polymerizable precursor composition, while in other embodiments the actinic radiation-polymerizable adhesive precursor composition comprises at least one solvent, such as for instance and without limitation C4-C12 alkanes (e.g., heptanes), alcohols (e.g., methanol, ethanol, or isopropanol), ethers, and esters.

The acrylic polymer can be, for example, an acrylic acid ester of a non-tertiary alcohol having from 1 to 18 carbon atoms. In some embodiments, the acrylic acid ester includes a carbon-to-carbon chain having 4 to 12 carbon atoms and terminates at the hydroxyl oxygen atom, the chain containing at least half of the total number of carbon atoms in the molecule.

Certain useful acrylic acid esters are polymerizable to a tacky, stretchable, and elastic adhesive. Examples of acrylic acid esters of nontertiary alcohols include but are not limited to 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Suitable acrylic acid esters of nontertiary alcohols include, for example, 2-ethylhexyl acrylate and isooctylacrylate.

To enhance the strength of the adhesive, the acrylic acid ester may be copolymerized with one or more monoethylenically unsaturated monomers that have highly polar groups. Such monoethylenically unsaturated monomer such as acrylic acid, methacrylic acid, itaconic acid, acrylamide, methacrylamide, N-substituted acrylamides (for example, N,N-dimethyl acrylamide), acrylonitrile, methacrylonitrile, hydroxyalkyl acrylates, cyanoethyl acrylate, N-vinylpyrrolidone, N-vinylcaprolactam, and maleic anhydride. In some embodiments, these copolymerizable monomers are used in amounts of less than 20% by weight of the adhesive matrix such that the adhesive is tacky at ordinary room temperatures. In some cases, tackiness can be preserved at up to 50% by weight of N-vinylpyrrolidone.

Especially useful are acrylate copolymers comprising at least 6% by weight acrylic acid, and in other embodiments, at least 8% by weight, or at least 10% by weight acrylic acid, each based on the total weight of the monomers in the acrylate copolymer. The adhesive may also include small amounts of other useful copolymerizable monoethylenically unsaturated monomers such as alkyl vinyl ethers, vinylidene chloride, styrene, and vinyltoluene.

In certain embodiments, adhesives according to the present disclosure comprise two-part acrylate and epoxy systems. For instance, suitable acrylate-epoxy compositions are described in detail in U.S. Application Publication No. 2003/0236362 (Bluem et al.) In certain embodiments, adhesives according to the present disclosure comprise two-part acrylate and urethane systems. For instance, suitable acrylate-urethane compositions are described in detail in U.S. Pat. No. 4,950,696 (Palazotto et al.)

Enhancement of the cohesive strength of the adhesive may also be achieved through the use of a crosslinking agent such as 1,6-hexanediol diacrylate, with a photoactive triazine crosslinking agent such as taught in U.S. Pat. No. 4,330,590 (Vesley) and U.S. Pat. No. 4,329,384 (Vesley et al.), or with a heat-activatable crosslinking agent such as a lower-alkoxylated amino formaldehyde condensate having C1-4 alkyl groups—for example, hexamethoxymethyl melamine or tetramethoxymethyl urea or tetrabutoxymethyl urea. Crosslinking may be achieved by irradiating the composition with electron beam (or "e-beam") radiation, gamma radiation, or x-ray radiation. Bisamide crosslinkers may be used with acrylic adhesives in solution.

In a typical photopolymerization method, a monomer mixture may be irradiated with actinic radiation, such as for example ultraviolet (UV) rays, in the presence of a photopolymerization initiator (i.e., photoinitiators). Suitable exemplary photoinitiators are those available under the trade designations IRGACURE and DAROCUR from BASF (Ludwigshafen, Germany) and include 1-hydroxycyclohexyl phenyl ketone (IRGACURE 184), 2,2-dimethoxy-1,2-diphenylethan-1-one (IRGACURE 651), bis(2,4,6-trimethylbenzoyl)phenylphosphineoxide (IRGACURE 819), 1-[4-(2-hydroxyethoxy)phenyl]-2-hydroxy-2-methyl-1-propane-1-one] (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one] (IRGACURE 907), Oligo[2-hydroxy-2-methyl-1-[4-(1-methylvinyl)phenyl]propanone] ESACURE ONE (Lamberti S.p.A., Gallarate, Italy), 2-hydroxy-2-methyl-1-phenyl propan-1-one (DAROCUR 1173), 2, 4, 6-trimethylbenzoyldiphenylphosphine oxide (IRGACURE TPO), and 2, 4, 6-trimethylbenzoylphenyl phosphinate (IRGACURE TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof. When used, a photoinitiator is typically present in an amount between about 0.01 to about 5.0 parts, or from 0.1 to 1.5 parts, per 100 parts by weight of total monomer.

The post-cure of the adhesive is optionally initiated using a thermal initiator. Suitable thermal initiators include for example and without limitation, 2,2'-azobis(2,4-dimethylvaleronitrile), 2,2'-azobisisobutyronitrile (VAZO 64, available from E.I. du Pont de Nemours Co.), 2,2'-azobis(2,4-dimethylpentanenitrile) (VAZO 52, available from E.I. du Pont de Nemours Co.), 2,2'-azobis-2-methylbutyronitrile, (1,1'-azobis(1-cyclohexanecarbonitrile), 2,2'-azobis(methyl isobutyrate), 2,2'-azobis(2-amidinopropane) dihydrochloride, 2,2'-azobis(4-methoxy-2,4-dimethylvaleronitrile), 4,4'-azobis(4-cyanopentanoic acid) and its soluble salts (e.g., sodium, potassium)benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butylperoxy-2-ethylhexanoate, dicumyl peroxide, potassium persulfate, sodium persulfate, ammonium persulfate, combinations of the persulfates with sodium metabisulfite or sodium bisulfite, benzoyl peroxide plus dimethylaniline, cumene hydroperoxide plus cobalt naphthenate, and combinations thereof. When used, a thermal initiator is typically present in an amount from about 0.01 to about 5.0 parts, or from 0.1 to 0.5 parts, per 100 parts by weight of total monomer.

There are several crosslinking mechanisms for acrylic polymers (particularly, adhesives) including free-radical copolymerization of multifunctional, ethylenically unsaturated groups with the other monomers, and covalent or ionic crosslinking through the functional monomers, such as acrylic acid. A suitable covalent crosslinker includes bis-aziridines, for instance 1,1'-isophthaloylbis(2-methylaziridine).

Another method is the use of UV crosslinkers, such as copolymerizable benzophenones or post-added photocrosslinkers, such as multifunctional benzophenones and triazines. A variety of different materials have typically been used as crosslinking agents, e.g., polyfunctional acrylates, acetophenones, benzophenones, and triazines. In certain embodiments, the at least one radiation-sensitive crosslinker of the actinic radiation-polymerizable adhesive precursor composition includes a co-polymerized type (II) photocrosslinker. Suitable co-polymerized type (II) photocrosslinkers for use herein will be easily identified by those skilled in the art, in the light of the present description. In one exemplary embodiment, the co-polymerized type (II) photocrosslinker may be co-polymerized together with the other monomers present in the mixture used to prepare the adhesive. In an alternative exemplary embodiment, the co-polymerized type (II) photocrosslinker for use herein may be co-polymerized into a crosslinking polymer, preferably an acrylate crosslinking polymer, and distinct from the adhesive.

In certain embodiments, the adhesive optionally comprises a crosslinking polymer. Suitable compositions for forming a crosslinking polymer for use herein will be easily identified by those skilled in the art, in the light of the present disclosure. Exemplary compositions useful for preparing a crosslinking polymer for use herein include for instance and without limitation, those comprising a monomer mixture comprising monomers selected from the group consisting of acrylic monomers, vinyl ester monomers, acryl amide monomers, alkyl (meth)acryl amide monomers, dialkyl acryl amide, styrenic monomers, and any combinations or mixtures thereof.

Accordingly, crosslinking polymers for use herein may be acrylate, vinyl ester, acryl amide, alkyl acryl amide, dialkyl acryl amide or styrene (co)polymers, including in particular monomers such as e. g. alkyl (meth)acrylamide monomers, di aryl (meth)acrylamide monomers, styrenic monomers (in particular low $T_g$ styrenic monomers such as, e.g., butoxystyrene monomers), vinyl ester monomers, and any combinations or mixtures thereof. In a preferred aspect, the crosslinking polymer is an acrylate crosslinking polymer.

The adhesive is optionally prepared from a monomer mixture comprising at least one linear or branched alkyl (meth)acrylate monomer, wherein the linear or branched alkyl group of the alkyl (meth)acrylate monomer preferably comprises from 1 to 24, more preferably from 4 to 20, even more preferably 6 to 15, still more preferably from 6 to 10 carbon atoms. The linear or branched alkyl (meth)acrylate monomer is optionally selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and any combinations or mixtures thereof. More preferably, the alkyl (meth)acrylate monomer for use herein is selected from the group consisting of iso-octyl acrylate, 2-ethylhexyl acrylate, butyl acrylate, and any combinations or mixtures thereof. Still more preferably, the alkyl (meth)acrylate monomer for use herein comprises (or consists of) iso-octyl acrylate.

According to a particular embodiment, a vinyl ester (co)-monomer, preferably a vinyl ester of versatic acid (co)-monomer, may be present in the (pre-polymerization) monomer mixture used to prepare the crosslinking polymer, typically in an amount of from 0 to 50 parts co-monomer, and is thus typically (co)polymerized with the acrylate monomers. Suitable vinyl esters of versatic acid (co)-monomers include the commercially available monomer: Veova 10, commercially available from Momentive, Columbus, Ohio Typically the vinyl ester co-monomer is used in amounts ranging from 0.5 to 40 parts, from 1.0 to 30 parts, from 5 to 25 parts, from 10 to 20 parts, or even from 15 to 20 parts, by weight per 100 parts by weight of acrylate crosslinking polymer.

When present, a crosslinking polymer is typically present in an amount of from 0.5 to 30 parts, from 0.5 to 20 parts, from 1.0 to 10 parts, or even from 2.0 to 8.0 parts by weight per 100 parts by weight of total monomer.

When present, a radiation-sensitive crosslinker is typically present in an amount of at least 0.05 parts by weight per 100 parts by weight of copolymer or at least 0.10 parts by weight per 100 parts by weight of total monomer, such as from 0.06 to 1 parts, from 0.11 to 1 parts, from 0.16 to 1 parts, from 0.18 to 0.70 parts, or even from 0.20 to 0.50 parts by weight per 100 parts by weight of total monomer.

In some embodiments, optionally one or more non-photocrosslinkable (co)polymers are included. Suitable non-photocrosslinkable (co)polymer include for example and without limitation, poly(methyl methacrylate), polyvinylbutyral, polystyrene and polyacrylonitrile, and combinations thereof. One or more non-photocrosslinkable (co)polymers are typically present in an amount from about 0.1 to about 25 parts by weight per 100 parts by weight of total monomer.

In order to increase cohesive strength of the adhesive composition, a multifunctional (meth)acrylate may be incorporated into the actinic radiation-polymerizable adhesive precursor composition. A multifunctional (meth)acrylate is particularly useful for emulsion or bulk polymerization, typically at low levels. Suitable multifunctional (meth)acrylates include for example without limitation, a di(meth)acrylate, tri(meth)acrylate, and tetra(meth)acrylate, such as 1,6-hexanediol di(meth)acrylate, a poly(ethylene glycol) di(meth)acrylate, polybutadiene di(meth)acrylate, a polyurethane di(meth)acrylate, propoxylated glycerin tri(meth)acrylate, and mixtures thereof.

When used, a multifunctional (meth)acrylate monomer is present in an amount of up to 0.05 parts or up to 0.1 parts, based on 100 parts by weight of total monomer. When used, a multifunctional (meth)acrylate monomer is present in an amount of at least 0.001 parts by weight or at least 0.005 parts, based on 100 parts by weight of total monomer. In certain embodiments, a multifunctional (meth)acrylate monomer is present in an amount of 0.001 parts to 0.1 parts, and in other embodiments 0.005 parts to 0.05 parts, based on 100 parts by weight of total monomer.

In certain embodiments, optionally one or more conventional adjuvants are included. Suitable adjuvants include for example and without limitation, a radiation-crosslinkable additive, a thickener, a particulate filler (e.g., an inorganic filler such as glass bubbles, glass beads, nanoparticles, microspheres, etc.), an antioxidant, a colorant, inhibitor, optical brightener, a scent, or combinations thereof. One or more absorption modifiers (e.g., dyes, optical brighteners, pigments, particulate fillers, etc.) are employed in at least certain embodiments of the actinic radiation-polymerizable adhesive precursor composition to limit the penetration depth of actinic radiation. Further, one or more inhibitors (e.g., butylated hydroxytoluene (BHT)), are optionally included in the actinic radiation-polymerizable adhesive precursor composition to limit the extent of polymerization of the precursor composition to the region of the precursor composition that is exposed to the actinic radiation. In certain embodiments, included microspheres are inorganic or synthetic resinous hollow microspheres. Inorganic hollow microspheres preferably are glass microspheres or microbubbles such as those described in U.S. Pat. No. 3,365,315. Organic resin microspheres are described in U.S. Pat. No. 2,797,201. In certain embodiments, the radiation-crosslinkable additive includes at least one bis(benzophenone).

Optionally, one or more tackifiers may be present in actinic radiation-polymerizable adhesive precursor composition. Suitable tackifiers typically include a terpene phenolic, rosin, rosin ester, ester of hydrogenated rosin, synthetic hydrocarbon resin, polyterpenes, aromatic-modified polyterpene resins, coumarone-indene resins, hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, dicyclopentadiene-based resins, or combinations thereof. In certain embodiments, the tackifier is a terpene resin, a hydrocarbon resin, a rosin resin, a petroleum resin, or combination thereof. Suitable synthetic hydrocarbon resins include for example and without limitation, aliphatic C5 hydrocarbons, aromatic C9 hydrocarbons, partially hydrogenated versions of any of the foregoing, fully hydrogenated versions of any of the foregoing, and combinations thereof.

Various types of tackifiers include phenol modified terpenes and rosin esters such as glycerol esters of rosin and pentaerythritol esters of rosin that are available under the trade names NUROZ, NUTAC (Newport Industries), PERMALYN, STAYBELITE, FORAL (Eastman). Also available are hydrocarbon resin tackifiers that typically come from $C_5$ and $C_9$ monomers by products of naphtha cracking and are available under the trade names PICCOTAC, EASTOTAC, REGALREZ, REGALITE (Eastman), ARKON (Arakawa), NORSOLENE, WINGTACK (Cray Valley), NEVTAC LX (Neville Chemical Co.), HIKOTACK, HIKOREZ (Kolon Chemical), NOVARES (Ruetgers N.V.), QUINTONE (Zeon), ESCOREZ (Exxon Mobile Chemical), NURES, and H-REZ (Newport Industries).

When used, the at least one tackifier is typically present in an amount greater than 10 parts per weight per 100 parts by weight of total monomer, or greater than 20 parts per weight, or greater than 30 parts per weight, or greater than 40 parts per weight per 100 parts by weight of total monomer, such as in amount from 40 parts to 70 parts by weight per 100 parts by weight of total monomer.

In many embodiments, the method comprises post-curing the one or more formed adhesives (e.g., the first adhesive, the second adhesive, the integral adhesive, etc.), for instance post-curing using actinic radiation, e-beam, or heat. In such embodiments, by not requiring an adhesive to be cured to the full extent needed for a particular application during an initial irradiation, radiation variables can be focused on polymerizing to form a desired shape and size.

Advantageously, the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED. The lamp is selected from an incandescent lamp, a flash lamp, a low pressure mercury lamp, a medium pressure mercury lamp, and a microwave driven lamp. As a result of the actinic radiation source, the adhesive comprises variations in index of refraction. More particularly, observation of a cross-section of the adhesive prepared according to exemplary methods of the disclosure reveals variations in index of refraction due to corresponding variations in cure provided by the discrete LEDs, or the DLP pixels, or the laser passes, or the LCD pixels, or the greyscale of the photomask. More particularly, a schematic is provided in FIG. 10 of a DLP with an LED or lamp, schematics are provided in FIGS. 11*a* and 11*b* of a photomask with a lamp or LED, a schematic is provided in FIG. 12 of an LCD panel with a backlight, and a schematic is provided in FIG. 13 of a laser scanning device with a laser.

Referring again to FIG. 10, a schematic is provided of an irradiation source 1000 for use in exemplary methods of the present disclosure, comprising a DLP 1065 with an LED or a lamp 1066 (1066 represents either an LED or a lamp). The DLP 1065 includes a plurality of individually movable reflectors, such as first reflector 1062, second reflector 1063, and third reflector 1064. Each reflector is positioned at a specific angle to direct irradiation from the LED or lamp 1066 towards a predetermined location of a composition 1016 disposed on a major surface 1011 of an actinic radiation-transparent substrate 1010. In use, the intensity and duration of the irradiation from the LED or lamp 1066 will impact the depth of cure (e.g., polymerization) of the composition 1016 in a direction normal to the major surface 1011 of the substrate 1010 upon formation of one or more adhesives 1017 and 1019. For instance, one portion 1017*b* of integral adhesive 1017 has a greater thickness than another portion 1017*a* of the same integral adhesive 1017. This may be achieved by irradiating the portion 1017*b* with a greater dosage than the portion 1017*a* is irradiated. In contrast, adhesive 1019 has a single thickness across its width due to receiving the same dosage across its width. A benefit of employing a DLP is that the individual reflectors are readily adjustable (e.g., using computer controls) to change the irradiation location and dosage and thereby the shape of the resulting formed adhesives, as needed without requiring a significant equipment alteration. DLPs are well-known in the art, for instance and without limitation, the apparatuses described in U.S. Pat. No. 5,658,063 (Nasserbakht), U.S. Pat. No. 5,905,545 (Poradish et al.), U.S. Pat. No. 6,587,159 (Dewald), U.S. Pat. No. 7,164,397 (Pettitt et al.), U.S. Pat. No. 7,360,905 (Davis et al.), U.S. Pat. No. 8,705,133 (Lieb et al.), and U.S. Pat. No. 8,820,944 (Vasquez). Suitable DLPs are commercially available, such as from Texas Instruments (Dallas, Tex.). As indicated above, either an LED or a lamp may be employed with a DLP. Suitable lamps may include a flash lamp, a low pressure mercury lamp, a medium pressure mercury lamp, and/or a microwave driven lamp. The skilled practitioner can select a suitable LED or lamp light source to provide the actinic radiation required to initiate polymerization for a particular polymerizable composition, for instance, the UV LED CBT-39-UV, available from Luminus Inc. (Sunnyvale, Calif.).

Figure 11A:
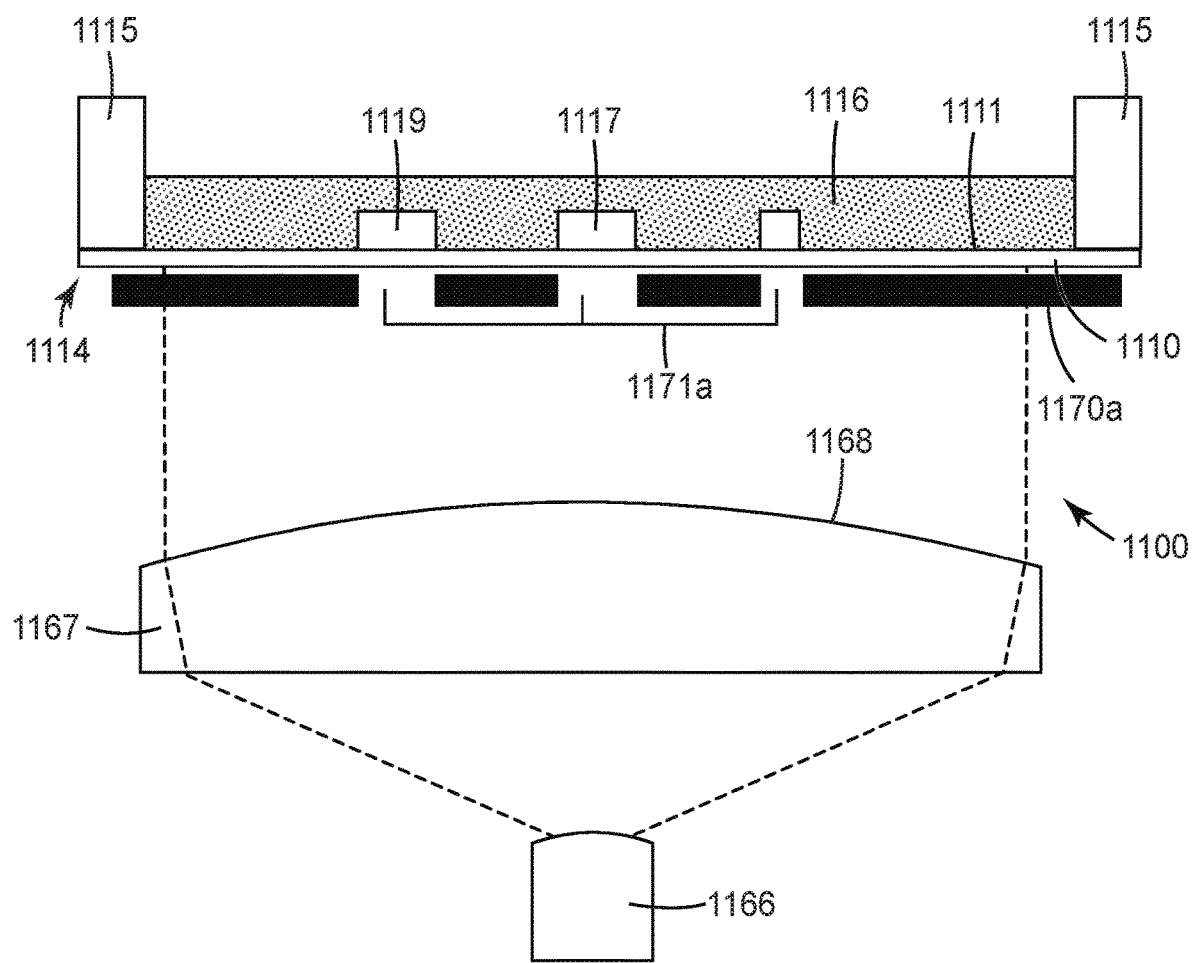
FIGS. 11A and 11B are schematic cross-sectional views of another exemplary irradiation source for use according to the present disclosure.
Figure 11B:
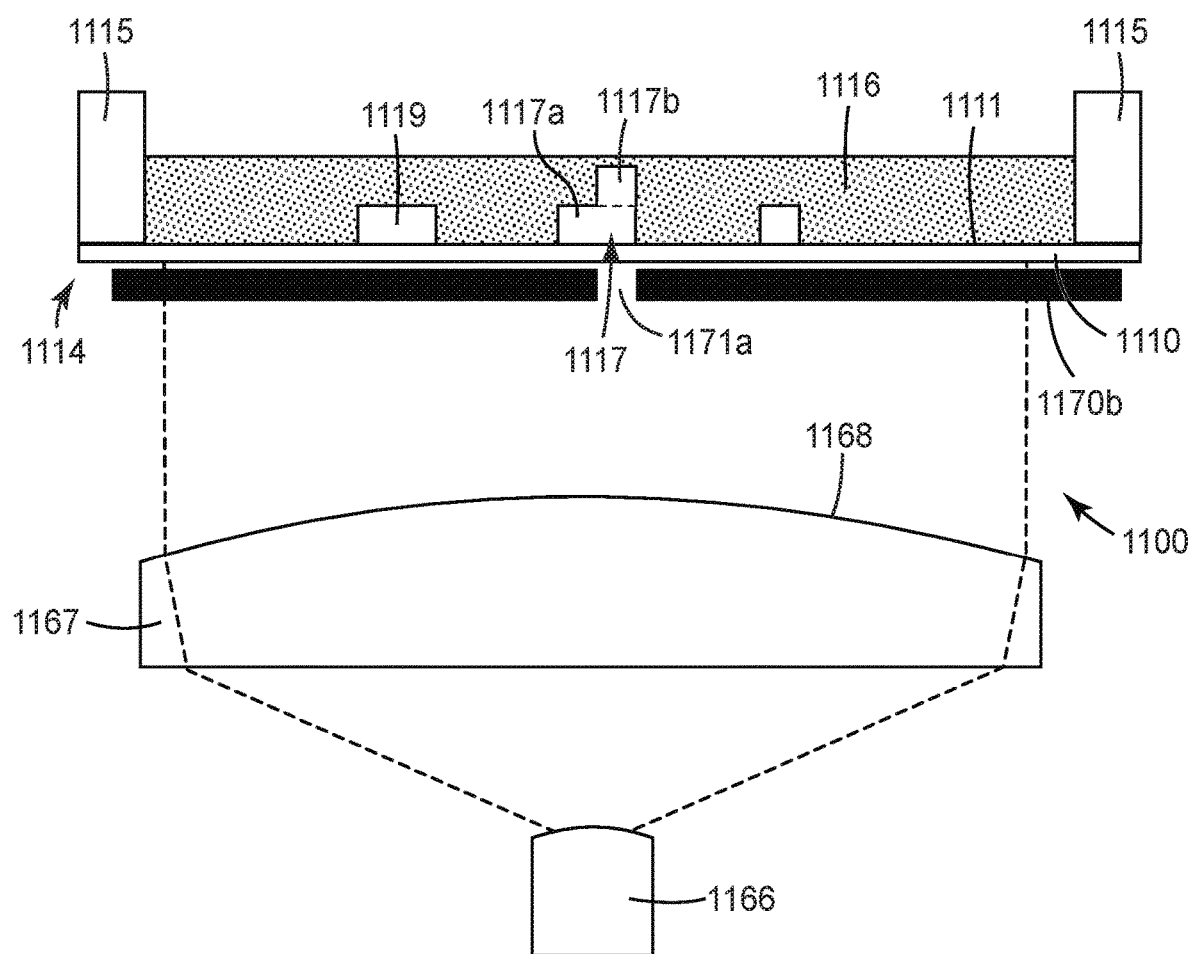

Referring to FIGS. 11A and 11B, schematics are provided including an irradiation source 1100 comprising at least one photomask 1170a and 1170b with an LED or a lamp 1166 (1166 represents either an LED or a lamp), for use in exemplary methods of the present disclosure. A lens 1167 having a convex surface 1168 is employed with the LED or lamp 1166 to diffuse the irradiation across at least a portion of the one or more photomasks 1170a and 1170b. As shown in FIG. 11A, a first photomask 1170a is employed to direct irradiation from the LED or lamp 1166 towards a predetermined location of a composition 1116 disposed on a major surface 1111 of an actinic radiation-transparent substrate 1110. In use, the intensity and duration of the irradiation from the LED or lamp 1166 will impact the depth of cure (e.g., polymerization) of the composition 1116 in a direction normal to the major surface 1111 of the substrate 1110 upon formation of one or more adhesives 1117 and 1119. For instance, one portion 1117b of integral adhesive 1117 has a greater thickness than another portion 1017a of the same integral adhesive 1117. This may be achieved by employing more than one photomask. For instance, referring to FIG. 11A, a photomask 1170a is shown in which a plurality of portions 1171a are provided through which irradiation can be directed to cure the composition 1116. Referring now to FIG. 11B, a second photomask 1170b is shown in which one portion 1171b is provided through which irradiation can be directed to further cure the composition 1116. In the illustrated embodiment, the portion 1117b has a greater thickness than the portion 1117a due to being irradiated twice; once using the first photomask 1170a and once using the second photomask 1170b; resulting in irradiation of the portion 1117b with a greater dosage than the portion 1117a. In contrast, adhesive 1119 has a single thickness across its width due to receiving the same dosage across its width by exposure to irradiation through just the first photomask 1170a. While the photomasks in FIGS. 11A and 11B are shown as having opaque and transparent portions, the skilled practitioner will appreciate that photomasks including greyscale may be employed to achieve gradients in cure in different locations of the composition. Suitable photomasks are commercially available, for instance, NanoSculpt Photomasks from Infinite Graphics (Minneapolis, Minn.). Similar to using a DLP, either an LED or a lamp may be employed with a photomask.

Figure 12:
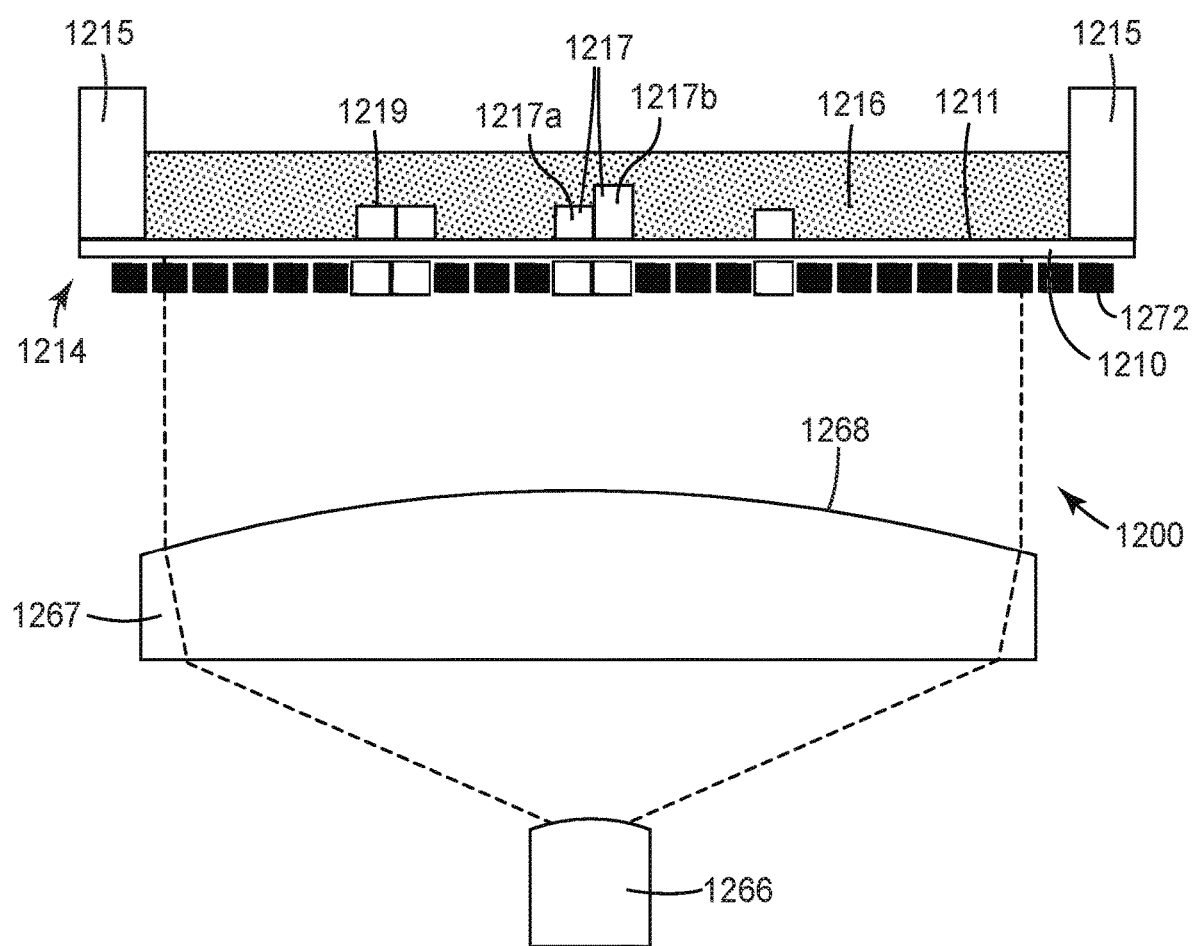
FIG. 12 is a schematic cross-sectional view of a further exemplary irradiation source for use according to the present disclosure.

Referring to FIG. 12, a schematic is provided of an irradiation source 1200 comprising a digital photomask 1272 (e.g., a LCD with a backlight 1266), wherein the backlight comprises an LED or a lamp 1266 (1266 represents either an LED or a lamp), for use in exemplary methods of the present disclosure. A lens 1267 having a convex surface 1268 is employed with the backlight 1266 to diffuse the irradiation across at least a portion of the digital photomask 1272. In use, the intensity and duration of the irradiation from the backlight 1266 will impact the depth of cure (e.g., polymerization) of the composition 1216 in a direction normal to the major surface 1211 of the substrate 1210 upon formation of one or more adhesives 1217 and 1219. For instance, one portion 1217b of integral adhesive 1217 has a greater thickness than another portion 1217a of the same integral adhesive 1217. This may be achieved by irradiating the portion 1217b with a greater dosage than the portion 1217a is irradiated. In contrast, adhesive 1219 has a single thickness across its width due to receiving the same dosage across its width. A benefit of employing a digital photomask is that the individual pixels are readily adjustable (e.g., using computer controls) to change the irradiation location and dosage and thereby the shape of the resulting formed adhesives, as needed without requiring a significant equipment alteration. Suitable LCDs are commercially available, for instance, the LCD LQ043T1DG28, available from Sharp Corporation (Osaka, Japan).

Figure 13:
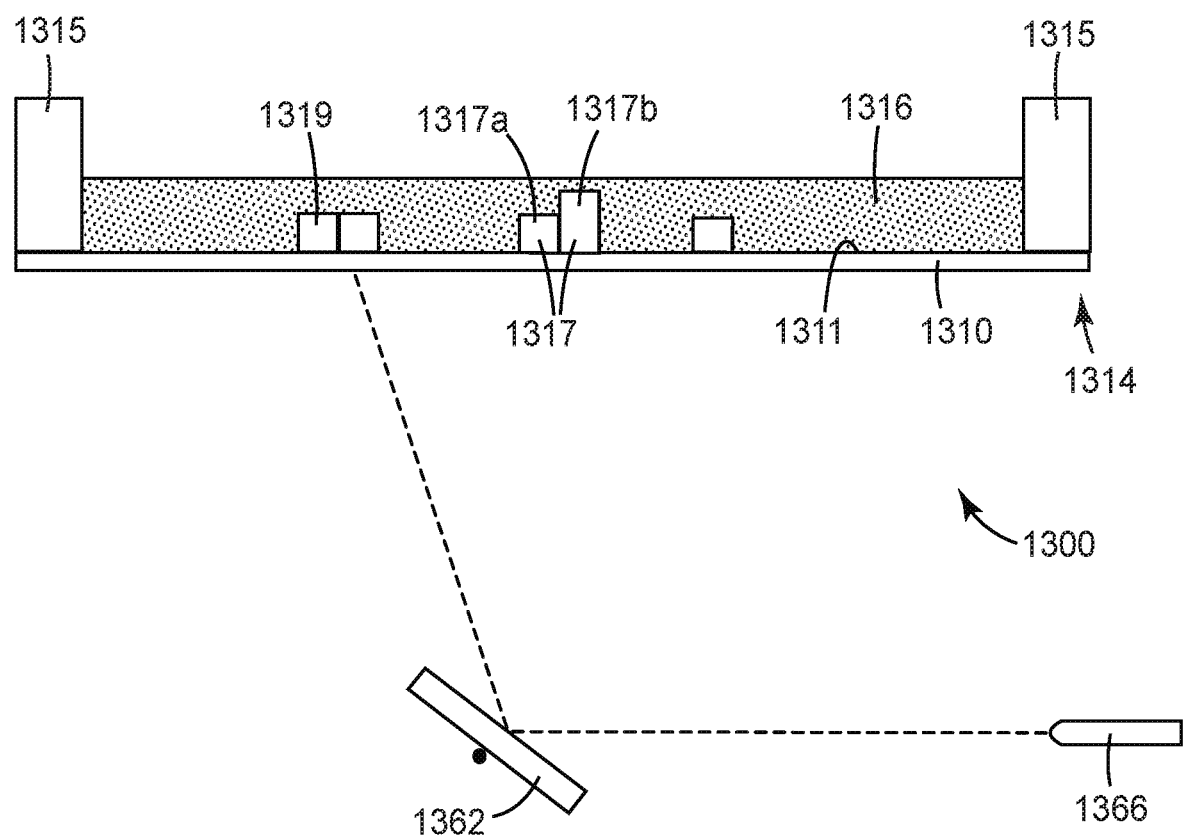
FIG. 13 is a schematic cross-sectional view of an additional exemplary irradiation source for use according to the present disclosure.

Referring to FIG. 13, a schematic is provided of an irradiation source 1300 comprising a laser scanning device 1362 with a laser 1366, for use in exemplary methods of the present disclosure. The laser scanning device 1362 includes at least one individually movable mirror. Each mirror is positioned at a specific angle to direct irradiation from the laser 1366 towards a predetermined location of a composition 1316 disposed on a major surface 1311 of an actinic radiation-transparent substrate 1310. In use, the intensity and duration of the irradiation from the laser 1366 will impact the depth of cure (e.g., polymerization) of the composition 1316 in a direction normal to the major surface 1311 of the substrate 1310 upon formation of one or more adhesives 1317 and 1319. For instance, one portion 1317b of integral adhesive 1317 has a greater thickness than another portion 1317a of the same integral adhesive 1317. This may be achieved by irradiating the portion 1317b with a greater dosage than the portion 1317a is irradiated. In contrast, adhesive 1319 has a single thickness across its width due to receiving the same dosage across its width. A benefit of employing a laser scanning device is that the individual mirror(s) are readily adjustable (e.g., using computer controls) to change the irradiation location and dosage and thereby the shape of the resulting formed adhesives, as needed without requiring a significant equipment alteration. Suitable laser scanning devices are commercially available, such as the JS2808 Galvanometer Scanner from Sino-Galvo (Beijing) Technology Co., LTD. (Beijing, China). The skilled practitioner can select a suitable laser to provide the actinic radiation required to initiate polymerization for a particular polymerizable composition, for instance, the CUBE 405-100C Diode Laser System from Coherent Inc. (Santa Clara, Calif.).

Accordingly, any of the above irradiation sources of the present disclosure are suitable for use in each of the apparatuses of the disclosed embodiments herein. It is an advantage of these irradiation sources that they are readily configured to provide one or more predetermined dosages of irradiation at one or more predetermined locations, allowing the manufacture of adhesives having variations in size and shape, particularly in thickness normal to a substrate.

In many embodiments, the method further comprises transferring the formed adhesive to a second substrate. Suitable substrates include for example and without limitation, a glass, a polymeric material, a ceramic, or a metal. The substrate is often a substrate to be included in an end use of the adhesive, such as in an electronic device.

The temperature(s) at which methods according to the present disclosure are performed is not particularly limited. For methods employing an actinic radiation-polymerizable adhesive precursor composition that is in a liquid form at room temperature (e.g., 20-25 degrees Celsius), for simplicity at least some of the various steps of the method are typically performed at room temperature. For methods employing an actinic radiation-polymerizable adhesive precursor composition that is in a solid form at room temperature, at least some of the various steps of the method may be performed at an elevated temperature above room temperature such that the actinic radiation-polymerizable adhesive precursor composition is in a liquid form. Elevated temperatures may be used through an entire method, or through such steps as formation of an adhesive, removal of unpolymerized actinic radiation-polymerizable adhesive precursor composition, and/or optional post-curing of the adhesive. In some embodiments, certain portions of the method are performed at different temperatures, whereas in some other embodiments, the entire method is performed at one temperature. Suitable elevated temperatures include for instance and without limitation, above 25 degrees Celsius and up to 150 degrees Celsius, up to 130 degrees Celsius, up to 110 degrees Celsius, up to 100 degrees Celsius, up to 90 degrees Celsius, up to 80 degrees Celsius, up to 70 degrees Celsius, up to 60 degrees Celsius, up to 50 degrees Celsius, or up to 40 degrees Celsius. In certain embodiments, the method is performed at a temperature between 20 degrees Celsius and 150 degrees Celsius, inclusive; between 30 degrees Celsius and 150 degrees Celsius, inclusive; between 25 degrees Celsius and 100 degrees Celsius, inclusive; or between 25 degrees Celsius and 70 degrees Celsius, inclusive. The temperature employed is typically limited only by the lowest maximum temperature at which a material used in the method (e.g., a substrate, an apparatus component, etc.) remains thermally stable.

The adhesive is determined to be an adhesive by testing that it successfully adheres two materials together. Typically, such a test involves disposing the formed adhesive between two substrates (one or both may be polymeric, paper, glass, ceramic, or metal), lifting the article by the edges of one of the substrates, and observing whether or not the second substrate remains attached to the article.

In a second aspect, an adhesive article is provided. The adhesive article includes a substrate having a major surface and an integral adhesive disposed on the major surface of the substrate. The adhesive has a variable thickness in an axis normal to the major surface of the substrate. The adhesive is prepared by a method as described in detail above with respect to the first aspect. Typically, the adhesive comprises variations in index of refraction as a result of the two or more irradiation dosages of the actinic radiation-polymerizable adhesive precursor composition.

The adhesive is any of a pressure sensitive adhesive (PSA), a structural adhesive, a structural hybrid adhesive, a hot melt adhesive, or a combination thereof, as discussed above. For instance, in certain embodiments, the adhesive comprises an acrylate, an epoxy, or combinations thereof.

Suitable substrates include for instance and without limitation, a polymeric material, a glass, a ceramic, or a metal. In some embodiments, the substrate comprises a polymeric material selected from polyethylene terephthalate, polyethylene naphthalate, polycarbonate, polyimide, cycloolefin films, poly(methyl methacrylate), or combinations thereof. The substrate optionally comprises a release material, such as when the adhesive will be transferred to another material or device. Depending on the end use of the adhesive, however, the adhesive may be permanently attached to the substrate. In some embodiments, the adhesive is advantageously disposed in a pattern on the substrate (e.g., more than one discrete adhesives and/or an adhesive that defines one or more apertures in the adhesive).

EXEMPLARY EMBODIMENTS

Embodiment 1 is a method of making an adhesive including obtaining an actinic radiation-polymerizable adhesive precursor composition disposed against a surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage. The first portion and the second portion are adjacent to or overlapping with each other and the first irradiation dosage and the second irradiation dosage are not the same. The method forms an integral adhesive having a variable thickness in an axis normal to the surface of the actinic radiation-transparent substrate.

Embodiment 2 is the method of embodiment 1, wherein the thickness of the integral adhesive is a fraction of the thickness of the precursor composition disposed against the surface of the substrate.

Embodiment 3 is the method of embodiment 1 or embodiment 2, wherein a ratio of the thickness of the integral adhesive to the thickness of the precursor composition disposed against the surface of the substrate is 10:90.

Embodiment 4 is the method of any of embodiments 1 to 3, wherein a ratio of the thickness of the integral adhesive to the thickness of the precursor composition disposed against the surface of the substrate is 30:70.

Embodiment 5 is the method of any of embodiments 1 to 4, wherein the actinic radiation-transparent substrate comprises a polymeric material selected from polyethylene terephthalate, polyethylene naphthalate, polycarbonate, polyimide, cycloolefin films, poly(methyl methacrylate), or combinations thereof.

Embodiment 6 is the method of any of embodiments 1 to 5, wherein the substrate comprises a release liner, a fluoropolymer film, or a glass comprising a release coating.

Embodiment 7 is the method of any of embodiments 1 to 6, wherein the substrate comprises a multilayer construction.

Embodiment 8 is the method of embodiment 7, wherein the multilayer construction comprises a polymeric sheet, an adhesive layer, and a liner.

Embodiment 9 is the method of embodiment 7 or embodiment 8, wherein the multilayer construction comprises a coating upon which the integral adhesive is disposed.

Embodiment 10 is the method of any of embodiments 1 to embodiment 9, wherein the substrate is a device.

Embodiment 11 is the method of embodiment 10, wherein the device is an organic light-emitting diode, a sensor, or a solar device.

Embodiment 12 is the method of embodiment 6, wherein the release liner comprises polyethylene terephthalate and silicone, or polypropylene and silicone.

Embodiment 13 is the method of any of embodiments 1 to 6, wherein the substrate comprises a glass selected from sodium borosilicate glass, soda-lime glass, and quartz glass.

Embodiment 14 is the method of any of embodiments 1 to 13, wherein the time of irradiation of the first dosage is different than the time of irradiation of the second dosage.

Embodiment 15 is the method of any of embodiments 1 to 14, wherein the actinic radiation intensity of the first dosage is lower than the actinic radiation intensity of the second dosage.

Embodiment 16 is the method of any of embodiments 1 to 15, wherein the actinic radiation intensity of the first dosage is greater than the actinic radiation intensity of the second dosage.

Embodiment 17 is the method of any of embodiments 1 to 16, wherein irradiating the first portion occurs before irradiating the second portion.

Embodiment 18 is the method of any of embodiments 1 to 17, wherein irradiating the first portion occurs at the same time as irradiating the second portion.

Embodiment 19 is the method of any of embodiments 1 to 18, wherein the actinic radiation-transparent substrate is a floor of a container and the irradiation is directed through the floor from below the floor.

Embodiment 20 is the method of any of embodiments 1 to 19, further comprising pouring off at least a portion of the adhesive precursor composition remaining in contact with the adhesive after the irradiating.

Embodiment 21 is the method of any of embodiments 1 to 20, further comprising removing at least a portion of the adhesive precursor composition remaining in contact with the adhesive after the irradiating using a gas, a vacuum, a fluid, or a combination thereof.

Embodiment 22 is the method of any of embodiments 1 to 21, further comprising post-curing the adhesive.

Embodiment 23 is the method of embodiment 22, wherein the post-curing comprises using actinic radiation or heat.

Embodiment 24 is the method of any of embodiments 1 to 23, wherein the adhesive is a pressure sensitive adhesive (PSA), a structural adhesive, a structural hybrid adhesive, a hot melt adhesive, or a combination thereof.

Embodiment 25 is the method of any of embodiments 1 to 24, wherein the adhesive precursor composition comprises an acrylate, a two-part acrylate and epoxy system, a two-part acrylate and urethane system, or a combination thereof.

Embodiment 26 is the method of any of embodiments 1 to 25, wherein the adhesive precursor composition comprises an acrylate.

Embodiment 27 is the method of any of embodiments 1 to 26, wherein the adhesive precursor composition comprises a photoinitiator.

Embodiment 28 is the method of embodiment 27, wherein the photoinitiator is selected from 1-hydroxy cyclohexyl phenyl ketone, 2,2-dimethoxy-1,2-diphenylethan-1-one, bis(2,4,6-trimethylbenzoyl)phenylphosphineoxide, 1-[4-(2-hydroxyethoxy)phenyl]-2-hydroxy-2-methyl-1-propane-1-one, 2-benzyl-2-dimethylamino-1-(4-morpholinophenyl)butanone, 2-methyl-1-[4-(methylthio)phenyl]-2-morpholinopropan-1-one, and 2-hydroxy-2-methyl-1-phenyl propan-1-one.

Embodiment 29 is the method of any of embodiments 1 to 28, wherein the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED.

Embodiment 30 is the method of embodiment 29, wherein the lamp is selected from a flash lamp, a low pressure mercury lamp, a medium pressure mercury lamp, and a microwave driven lamp.

Embodiment 31 is the method of any of embodiments 1 to 30, further comprising transferring the formed adhesive to a second substrate.

Embodiment 32 is the method of embodiment 31, wherein the second substrate comprises a glass, a polymeric material, a ceramic, or a metal.

Embodiment 33 is the method of any of embodiments 1 to 32, wherein the adhesive adheres two materials together.

Embodiment 34 is the method of any of embodiments 1 to 33, wherein the adhesive comprises a PSA.

Embodiment 35 is the method of any of embodiments 1 to 34, wherein the adhesive comprises variations in index of refraction.

Embodiment 36 is the method of any of embodiments 1 to 35, wherein the actinic radiation-polymerizable adhesive precursor composition is a 100% polymerizable precursor composition.

Embodiment 37 is the method of any of embodiments 1 to 36, wherein the actinic radiation-polymerizable adhesive precursor composition comprises at least one solvent.

Embodiment 38 is the method of embodiment 37, wherein the solvent is selected from heptanes, alcohols, ethers, esters, or a combination thereof.

Embodiment 39 is the method of any of embodiments 1 to 38, wherein the method is performed at a temperature between 20 degrees Celsius and 150 degrees Celsius, inclusive.

Embodiment 40 is an adhesive article including a substrate having a major surface and an integral adhesive disposed on the major surface of the substrate. The adhesive has a variable thickness in an axis normal to the major surface of the substrate.

Embodiment 41 is the adhesive article of embodiment 40, wherein the adhesive is disposed in a pattern on the substrate.

Embodiment 42 is the adhesive article of embodiment 40 or embodiment 41, wherein the substrate comprises a polymeric material, a glass, a ceramic, or a metal.

Embodiment 43 is the adhesive article of any of embodiments 40 to 42, wherein the substrate comprises a release material.

Embodiment 44 is the adhesive article of any of embodiments 40 to 42, wherein the adhesive is permanently attached to the substrate.

Embodiment 45 is the adhesive article of any of embodiments 40 to 44, wherein the substrate comprises a polymeric material selected from polyethylene terephthalate, polyethylene naphthalate, polycarbonate, polyimide, cycloolefin films, poly(methyl methacrylate), or combinations thereof.

Embodiment 46 is the adhesive article of any of embodiments 40 to 45, wherein the adhesive is a pressure sensitive adhesive (PSA), a structural adhesive, a structural hybrid adhesive, a hot melt adhesive, or a combination thereof.

Embodiment 47 is the adhesive article of any of embodiments 40 to 46, wherein the adhesive comprises an acrylate, an epoxy, or combinations thereof.

Embodiment 48 is the adhesive article of any of embodiments 40 to 47, wherein the adhesive adheres two materials together.

Embodiment 49 is the adhesive article of any of embodiments 40 to 48, wherein the adhesive comprises a PSA.

Embodiment 50 is the adhesive article of any of embodiments 40 to 49, wherein the adhesive further comprises at least one inorganic filler.

Embodiment 51 is the adhesive article of any of embodiments 40 to 50, wherein the adhesive comprises variations in index of refraction.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides a role and a source for materials used in the Examples below:

TABLE 1

| Materials | | | |
|---|---|---|---|
| Function | Abbreviation | Description | Source |
| Monomer 1 | iOA | IsoOctyl Acrylate | 3M, St Paul, MN |
| Monomer 2 | AA | Acrylic Acid | Sigma-Aldrich, St Louis, MO |
| Monomer 3 | iBOA | IsoBornyl Acrylate | OSAKA Organic Chemical Industry LTD, Osaka, Japan |
| Monomer 4 | SR440 | IsoOctyl Acrylate | Sartomer Americas, Exton, PA |
| Monomer 5 | SR420 | 3,3,5-Trimethyl cyclohexyl Acrylate | Sartomer Americas, Exton, PA |
| Monomer 6 | MA0735 | methacryl POSS (polyoctahedryl silsesquioxane) cage mixture | Hybrid Plastics Inc, Hattiesburg, MS |
| Crosslinker1 | HDDA | 1,6-Hexanedioldiacrylate | Sartomer Americas, Exton, PA |
| Initiator 1 | IRGACURE TPO | 2,4,6-trimethylbenzoyldiphenylphosphine oxide | BASF Corporation, Florham Park, NJ |
| Initiator 2 | IRGACURE TPO-L | 2,4,6-trimethylbenzoylphenyl phosphinate | BASF SE, Ludwigshafen, Germany |
| Inhibitor | BHT | 2,6 Di-tert-butyl-4-methyl-phenol | Sigma-Aldrich, St Louis, MO |
| Absorption Modifier 1 | UVITEX OB | Benzoxazole, 2,2'-(2,5-thiophenediyl)bis[5-(1,1-dimethylethyl)] | Ciba Specialty Chemicals, Tarrytown, NY |
| Absorption Modifier 2 | TINOPAL OB CO | Benzoxazole, 2,2'-(2,5-thiophenediyl)bis[5-(1,1-dimethylethyl)] | BASF Corporation, Florham Park, NJ |
| Solvent 1 | Acetone | Acetone | EMD Chemicals Inc, Gibbstown, NJ |
| Solvent 2 | n-Heptane | n-Heptane | VWR Analytical, Radnor, PA |
| Liquid Adhesive | UV B-Stage | 3M UV B-Stage Adhesive 1051 | 3M, St Paul, MN |

Experimental Apparatuses

Experimental Apparatus 1: A first experimental apparatus was constructed by taking an Asiga PicoPlus39 3D printer, available from Asiga, Anaheim Hills, Calif., USA, and removing the build platform and the resin tray. This printer uses a digital light projector with a 405 nm LED as source of actinic radiation.

Experimental Apparatus 2: A second experimental apparatus was constructed by taking an Asiga Pico2 3D printer, available from Asiga, Anaheim Hills, Calif., USA, and removing the build platform and the resin tray. This printer uses a digital light projector with a 385 nm LED as source of actinic radiation.

A UV Intensity Analyzer, Model 356, from OAI Instruments, San Jose, Calif., was used to measure the intensity of the projected image at the projection plane of the printers. The 400 nm broad band sensor was attached to the Analyzer, and the sensor surface was centered on the rectangular test image of the printer. For Experimental Apparatus 1 an actinic radiation intensity of 12.3 mW/cm$^2$ was measured, and for Experimental Apparatus 2 an intensity of 22.4 mW/cm$^2$ was measured.

Example 1

A 125 ml amber glass jar was charged with 87.5 g IsoOctyl Acrylate (IOA), 12.5 g Acrylic Acid (AA), 0.1 g Hexanedioldiacrylate (HDDA), then 1.5 g IRGACURE TPO-L, 0.1 g 2,6 Di-tert-butyl-4-methyl-phenol (BHT) and 0.1 g Benzoxazole,2,2'-(2,5-thiophenediyl)bis[5-(1,1-dimethylethyl)] (UVITEX OB) were added. The jar was sealed and rotated on a laboratory bench top roller MX-T6-S, available from SCILOGEX, Rocky Hill, Conn., at approximately 10 RPM for 2 hours. This was labeled Composition 1.

A piece of clear, 5 mil (127 micrometers) thick PET release liner RF12N, available from SKC Haas, Seoul, Korea, was cut to approximately 3 inch (7.62 cm) by 4 inch (10.16 cm) in size. Then a piece of green adhesive backed rubber, available as 3M Sandblast Stencil 507, 3M, St Paul, Minn., was cut to form a rectangle approximately 3 inch (7.62 cm) by 2 inch (5.08 cm) in size, with a rectangular inner opening 2.25 inch (5.72 cm) by 1.25 inch (3.18 cm) in size. The rectangle then was adhered to the release liner, and approximately 1.5 ml of the composition was dropped onto the release liner in the area confined by the rectangular rubber. This assembly then was placed on the optical window of the Experimental Apparatus 1, forming essentially the arrangement depicted in FIG. 10.

An image consisting of a first set of lines, circles and alphabetic characters and a second set of lines, circles, and alphabetic characters then was loaded into the control software of the Experimental Apparatus 1. In a first exposure step, both the first set and the second set of lines, circles, and alphabetic characters were projected for 10 seconds through the release liner into the composition. Then in a second exposure step only the image of the second set of lines, circles, and alphabetic characters was projected for 10 seconds through the liner into the composition, at the same location as the first exposure of this image.

The assembly then was removed from the Experimental Apparatus 1, the liquid was poured off, the rubber rectangle was removed, and remaining liquid was blown off with compressed air and a round air nozzle. Adhesive features in the shape the image of lines, circles and alphabetic characters were found on the liner. These features were covered with a second piece of the same release liner and cured for 10 minutes in an Asiga Flash UV post cure chamber, available from Asiga, Anaheim Hills, Calif., USA. This post cure chamber contained four 9 W fluorescent bulbs with a peak wavelength of 365 nm, arranged approximately 2 inches (5.08 cm) from a 5.5 inch (13.97 cm) by 5.75 inch (14.61 cm) base plate. The UV intensity was measured using the UV Intensity Analyzer, Model 356, from OAI Instruments, San Jose, Calif., with the 400 nm broad band sensor. A UV intensity of approximately 5.3 mW/cm$^2$ was found throughout the base plate.

The thickness of the adhesive in the region corresponding to the first set of lines, circles and alphabetic characters was measured as 230 microns, while the thickness in the region corresponding to the second set of lines, circles and alphabetic characters was measured as 350 microns. These were each a fraction of the thickness of the liquid composition, which was calculated to be approximately 800 microns, disposed on the liner.

The adhesive was touched with a finger and the features felt sticky and adhered to the finger like a pressure sensitive adhesive. It was observed that it failed cohesively and that strings of material could be pulled from the adhesive.

Example 2

A 60 ml amber glass jar was charged with 21.9 g IOA, 21.9 g IsoBornyl Acrylate (iBOA) and 12.5 g AA, 0.156 g HDDA, then 0.75 g IRGACURE TPO, 0.05 BHT and 0.1 g Benzoxazole,2,2'-(2,5-thiophenediyl)bis[5-(1,1-dimethylethyl)] (Tinopal OB CO) were added. The jar was sealed and rotated on a laboratory bench top roller at approximately 10 RPM for 2 hours. This was labeled Composition 2.

A piece of release liner with rubber rectangle was prepared as in Example 1, and 1.5 ml of Composition 2 was dropped onto the release liner in the area confined by the rectangular rubber. This assembly then was placed on the optical window of the Experimental Apparatus 2, forming essentially the arrangement depicted in FIG. 10.

A computer model of the shape depicted in FIG. 1 was loaded into the control software of the experimental apparatus 2, and the software generated three exposure images, depicted in FIGS. 2A, 2B and 2C. In a first exposure step the image depicted in FIG. 2A was projected for 2.5 seconds through the release liner into the composition. Then in a second exposure step the image depicted in FIG. 2B was projected for 2.5 seconds through the release liner into the composition, at the same location as the exposure of the Image depicted in FIG. 2A. Then in a third exposure step the image depicted in FIG. 2C was projected for 2.5 seconds through the release liner into the composition, at the same location as the exposure of the image depicted in FIGS. 2A and 2B.

The assembly then was removed from the Experimental Apparatus 2, the liquid was poured off, the rubber rectangle was removed and remaining liquid was blown off with compressed air and a round air nozzle. Adhesive features in the shape the image in FIG. 1 were found on the liner.

The adhesive was left uncovered and was post cured for 10 minutes in the Asiga Flash UV post cure chamber.

The thickness of the adhesive features was measured using a Keyence scanning laser microscope, Model VK-X200 available from Keyence Corporation, Osaka, Japan. Referring to FIG. 1, the thickness of the adhesive corresponding to the first array of interconnected hexagons 102 was measured to be 50 microns, the thickness of the adhesive corresponding to the second array of interconnected hexagons 104 was measured to be 77 microns, and the thickness of the adhesive corresponding to the frame 106 was measured to be 108 microns.

The adhesive was touched with a finger and it felt sticky and adhered to the finger like a pressure sensitive adhesive. It was observed that the adhesive had good cohesion and did not draw strings. The adhesive was pressed onto a microscopy glass slide and adhered well. Then the liner was removed, the adhesive remained on the glass slide, and a piece of paper was pressed onto and adhered to the adhesive on the glass slide.

Example 3

A piece of release liner with rubber rectangle was prepared as in Example 1, and approximately 2 ml of 3M UV B-stage Adhesive 1051, a liquid dual cure (UV/heat) adhesive, was poured onto the release liner in the area confined by the rectangular rubber. The thickness of the layer of the 3M UV B-Stage Adhesive 1051 was calculated to be approximately 1 mm. This assembly then was placed on the optical window of the Experimental Apparatus 1, forming essentially the arrangement depicted in FIG. 10.

An image consisting of a set of lines, circles, and alphabetic characters then was loaded into the control software of the Experimental Apparatus 1. In a single exposure step, the set of lines, circles, and alphabetic characters were projected for 20 seconds through the release liner into the composition.

The assembly then was removed from the Experimental Apparatus 1, the excess 3M UV B-stage Adhesive 1051 was poured off and remaining liquid adhesive then was washed off using acetone.

It was found that a pressure sensitive adhesive in the shape of the exposed image remained on the liner. Using a digital caliper, the thickness of the adhesive was measured to be 750 micron.

The pressure sensitive adhesive then was pressed onto a piece of 2 mm thick aluminum sheet. The pressure sensitive adhesive was covered with a polycarbonate plastic sheet, then cured in an oven at 110 degree Celsius for 10 minutes.

It was observed that the adhesive cured and bonded the polycarbonate plastic sheet to the aluminum sheet.

Example 4

A 125 ml amber glass jar was charged with 52.4 g IsoOctyl Acrylate (SR440), 3.96 g 3,3,5-Trimethyl cyclohexyl Acrylate (SR420), 3.0 g methacryl POSS (polyoctahedryl silsesquioxane) cage mixture (MA0735), then 0.6 g IRGACURE TPO-L and 12.0 g n-heptane were added. The mixture was stirred using a magnetic stir bar and plate at room temperature for about 30 minutes. This was labeled Composition 4.

A piece of release liner with rubber rectangle was prepared as in Example 1, and 1.5 ml of Composition 4 was dropped onto the release liner in the area confined by the rectangular rubber. This assembly then was placed on the optical window of the Experimental Apparatus 2, forming essentially the arrangement depicted in FIG. 10.

A computer model of the shape depicted in FIG. 1 was loaded into the control software of the experimental apparatus 2, and the software generated three exposure images, depicted in FIGS. 2A, 2B and 2C. In a first exposure step the image depicted in FIG. 2A was projected for 5.0 seconds through the release liner into the composition. Then in a second exposure step the image depicted in FIG. 2B was projected for 5.0 seconds through the release liner into the composition, at the same location as the exposure of the image depicted in FIG. 2A. Then in a third exposure step the image depicted in FIG. 2C was projected for 5.0 seconds through the release liner into the composition, at the same location as the exposure of the image depicted in FIGS. 2A and 2B.

The assembly then was removed from the Experimental Apparatus 2, the liquid was poured off, the rubber rectangle was removed and remaining liquid was blown off with compressed air and a round air nozzle. Adhesive features in the shape the image in FIG. 1 were found on the liner.

The adhesive was left uncovered and the heptane was allowed to evaporate for 15 minutes. Then the adhesive was post cured for 10 minutes in the Asiga Flash UV post cure chamber.

The thickness of the adhesive features was measured using the Keyence scanning laser microscope. Referring to FIG. 1, the thickness of the adhesive corresponding to the first array of interconnected hexagons 102 was measured to be 44 microns, the thickness of the adhesive corresponding to the second array of interconnected hexagons 104 was measured to be 115 microns, and the thickness of the adhesive corresponding to the frame 106 was measured to be 155 microns.

The adhesive was touched with a finger and it felt sticky and adhered to the finger like a pressure sensitive adhesive. It was observed that the adhesive had good cohesion and draw minimal strings. The adhesive was pressed onto a microscopy glass slide and adhered well. Then the liner was removed, the adhesive remained on the glass slide, and a piece of paper was pressed onto and adhered to the adhesive on the glass slide.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method of making an adhesive comprising:
    obtaining an actinic radiation-polymerizable adhesive precursor composition disposed against a surface of an actinic radiation-transparent substrate;
    irradiating a first portion of the actinic radiation-polymerizable adhesive precursor composition through the actinic radiation-transparent substrate and in a direction normal to the actinic radiation-transparent substrate surface for a first irradiation dosage; and
    irradiating a second portion of the actinic radiation-polymerizable adhesive precursor composition through the actinic radiation-transparent substrate and in a direction normal to the actinic radiation-transparent substrate surface for a second irradiation dosage, wherein the first irradiation dosage and the second irradiation dosage are not the same, providing a greater depth of cure in the direction normal to the actinic radiation-transparent substrate surface for the portion that received a greater irradiation dosage than for the portion that received a smaller irradiation dosage, thereby forming an integral adhesive polymerized on the surface of the radiation-transparent substrate, the integral adhesive comprising a variable thickness in an axis normal to the surface of the actinic radiation-transparent substrate, wherein 1) the first portion and the second portion are overlapping with each other in an axis parallel to the actinic radiation-transparent substrate surface and each of the first portion and the second portion are polymerized on the surface of the radiation-transparent substrate or 2) one of the first irradiation dosage or the second irradiation dosage passes through a portion of the integral adhesive before further curing the actinic radiation-polymerizable adhesive precursor composition to provide the greater depth of cure in the direction normal to the actinic radiation-transparent substrate surface, and wherein the adhesive comprises variations in index of refraction.

2. The method of claim 1, wherein the thickness of the integral adhesive is a fraction of the thickness of the precursor composition disposed against the surface of the substrate, wherein a ratio of the thickness of the integral adhesive to the thickness of the precursor composition is 10:90 to 90:10.

3. The method of claim 1, wherein the time of irradiation of the first dosage is different than the time of irradiation of the second dosage.

4. The method of claim 1, wherein the actinic radiation intensity of the first dosage is different from the actinic radiation intensity of the second dosage.

5. The method of claim 1, wherein irradiating the first portion occurs before irradiating the second portion.

6. The method of claim 1, wherein irradiating the first portion occurs at the same time as irradiating the second portion.

7. The method of claim 1, further comprising pouring off at least a portion of the adhesive precursor composition remaining in contact with the adhesive after the irradiating.

8. The method of claim 1, further comprising removing at least a portion of the adhesive precursor composition remaining in contact with the adhesive after the irradiating using a gas, a vacuum, a fluid, or a combination thereof.

9. The method of claim 1, further comprising post-curing the adhesive.

10. The method of claim 1, wherein the adhesive is a pressure sensitive adhesive (PSA), a structural adhesive, a structural hybrid adhesive, a hot melt adhesive, or a combination thereof.

11. The method of claim 1, wherein the adhesive precursor composition comprises an acrylate, a two-part acrylate and epoxy system, a two-part acrylate and urethane system, or a combination thereof.

12. The method of claim 1, wherein the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED.

13. The method of claim 1, wherein the method is performed at a temperature between 20 degrees Celsius and 150 degrees Celsius, inclusive.

14. The method of claim 1, further comprising transferring the formed adhesive to a second substrate.

15. The method of claim 1, wherein the actinic radiation-polymerizable adhesive precursor composition includes at least one solvent.

* * * * *